Nov. 8, 1966   L. A. SMITZER ETAL   3,283,680
MICROXEROGRAPHIC REPRODUCTION APPARATUS
Filed March 26, 1964   14 Sheets-Sheet 1
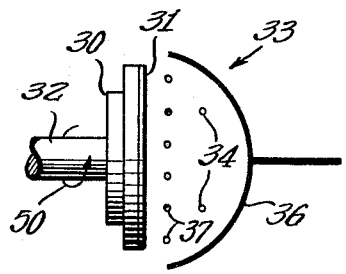
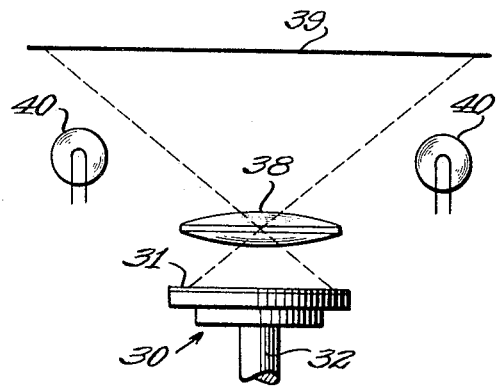
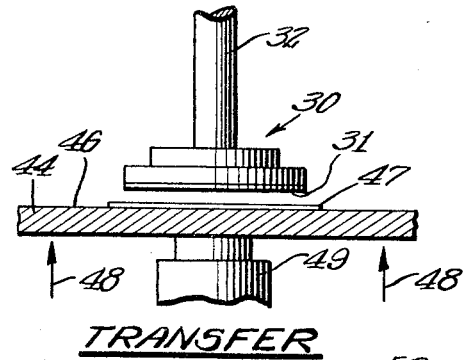
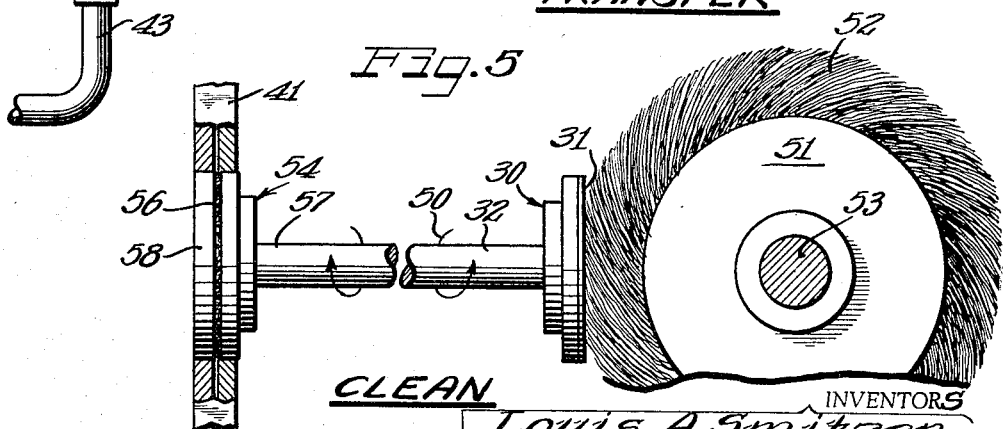
INVENTORS
Louis A. Smitzer
Adolph J. Gawin
Maynard C. Gross
Andrew Balint
William E. Bixby
ATTORNEYS

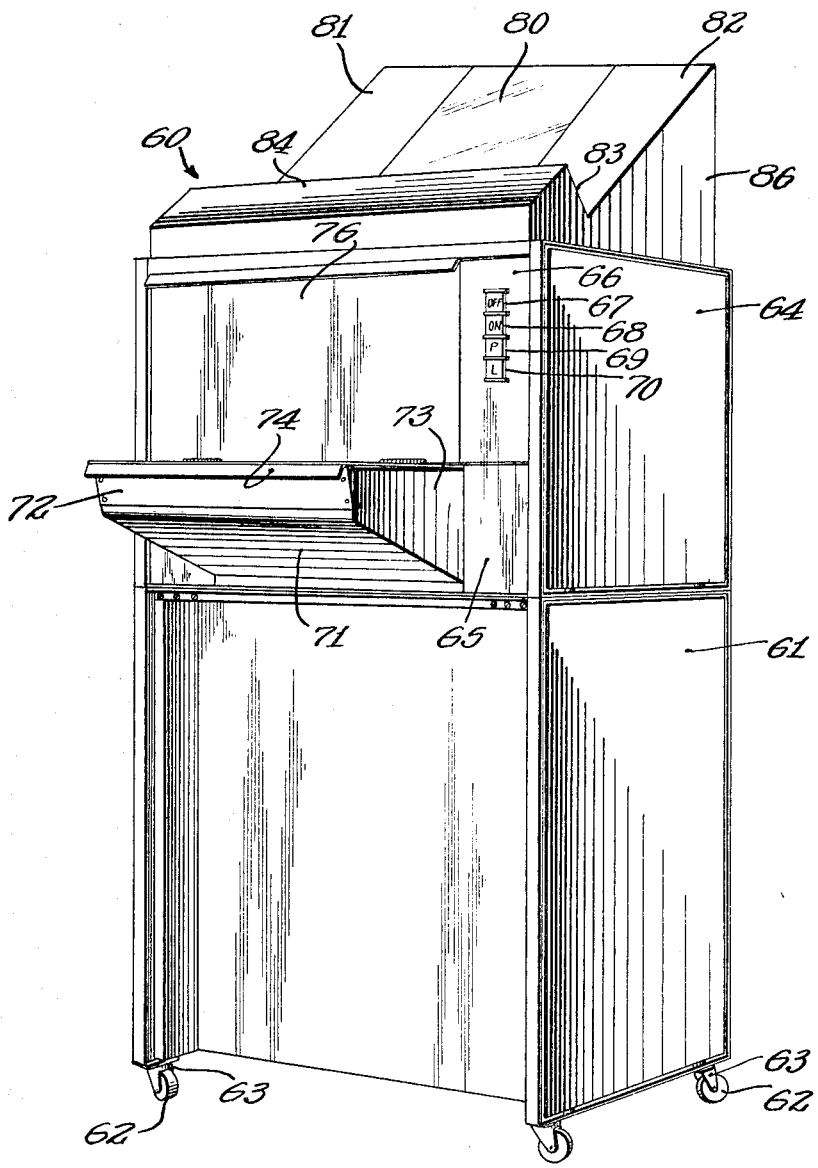

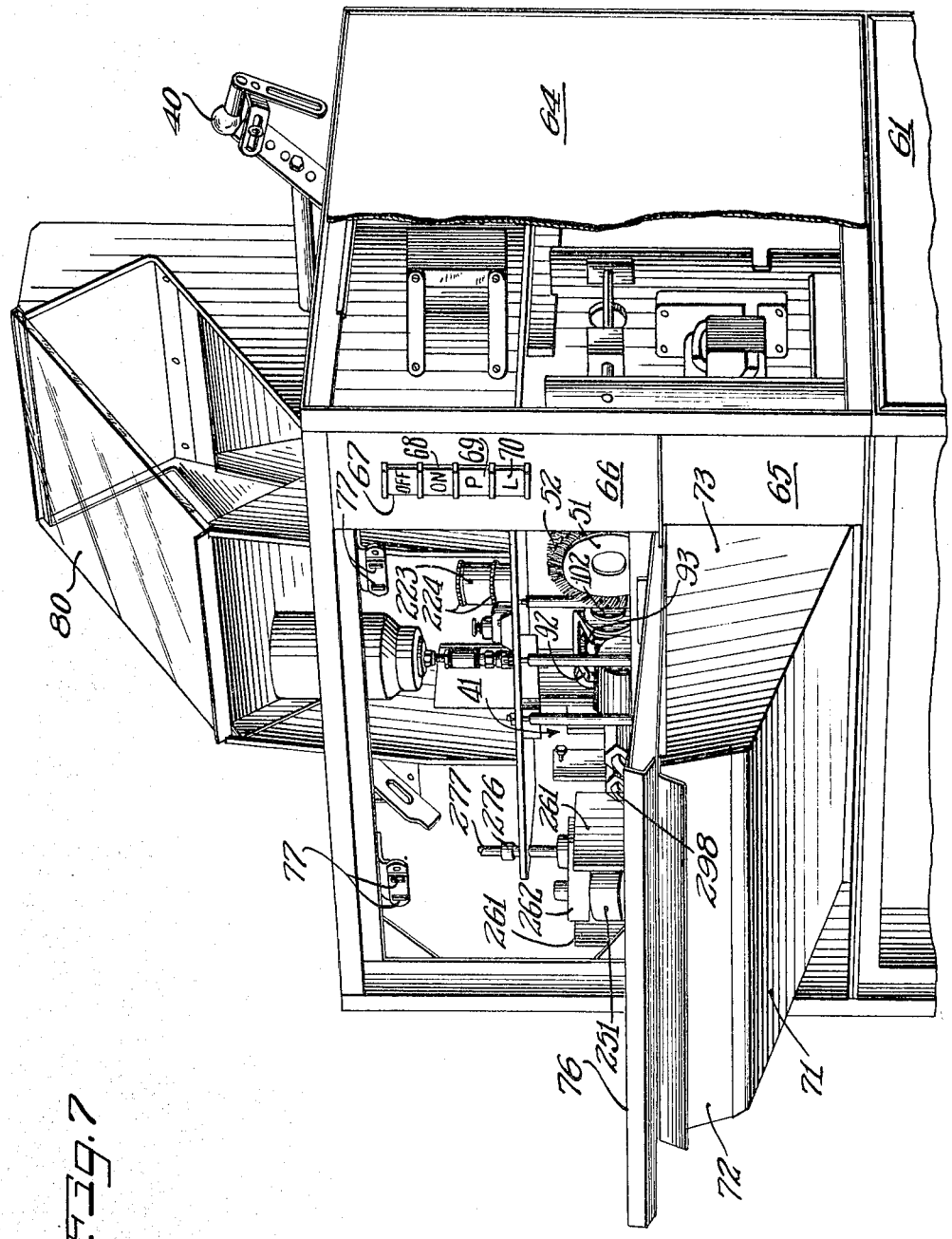

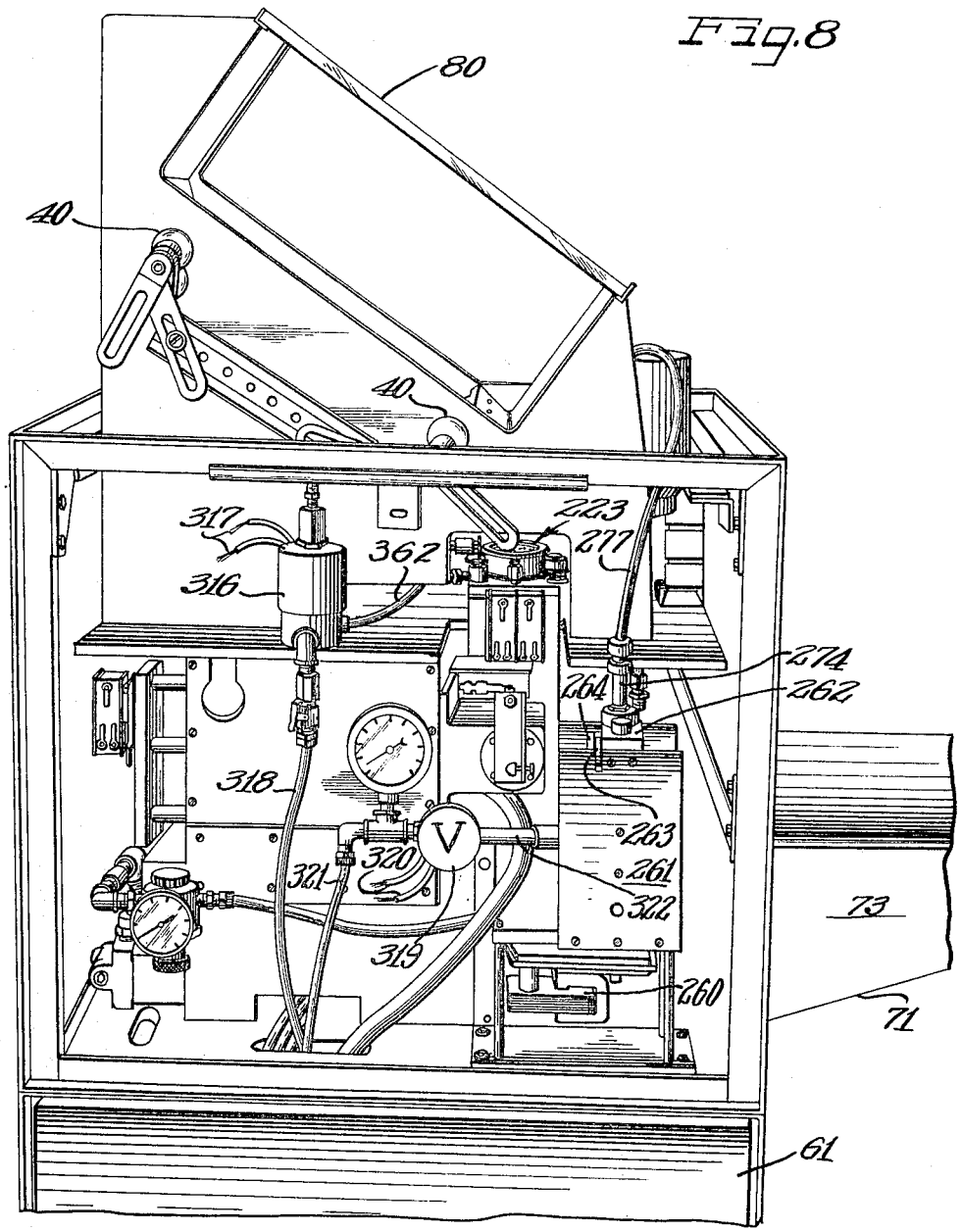

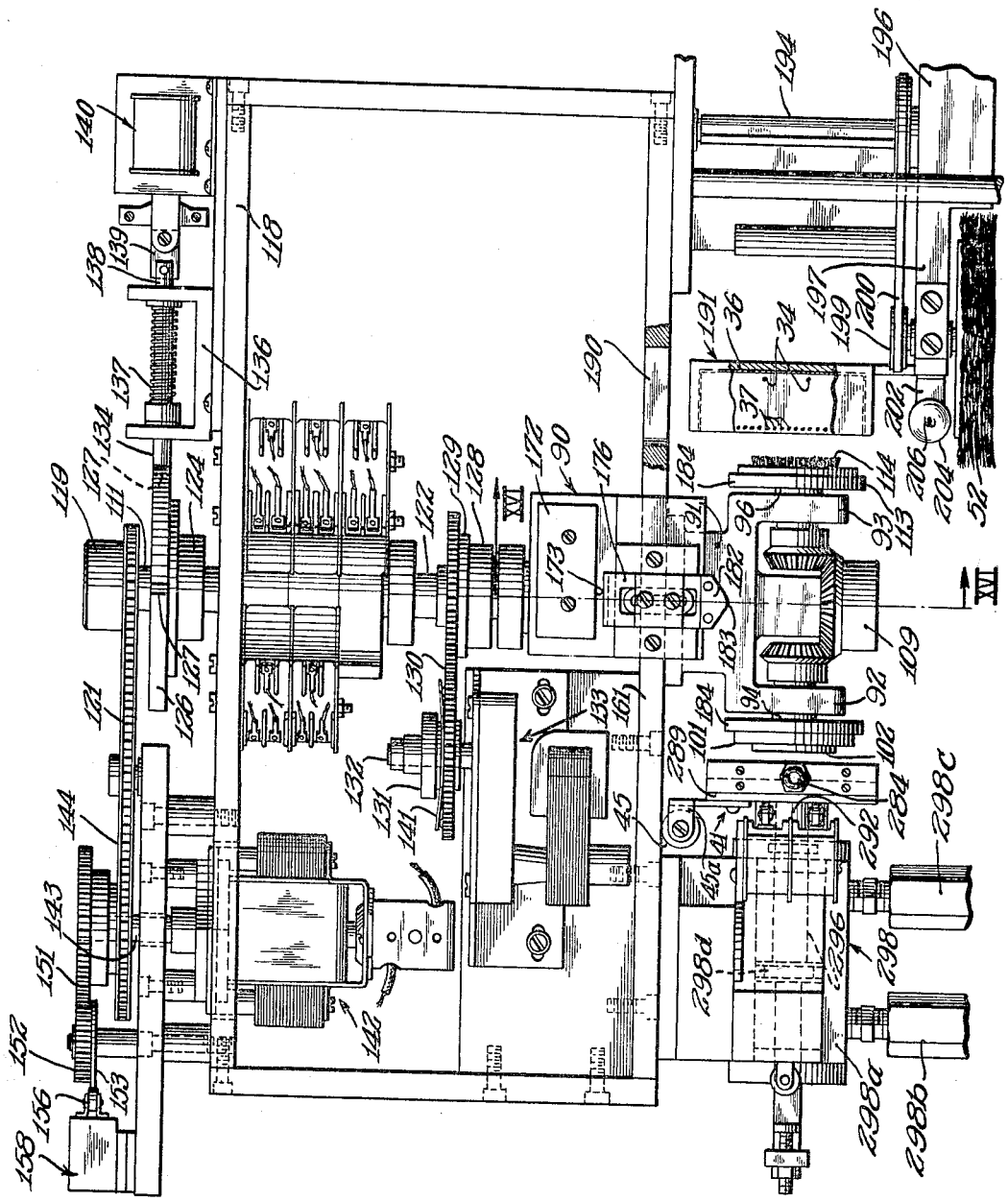

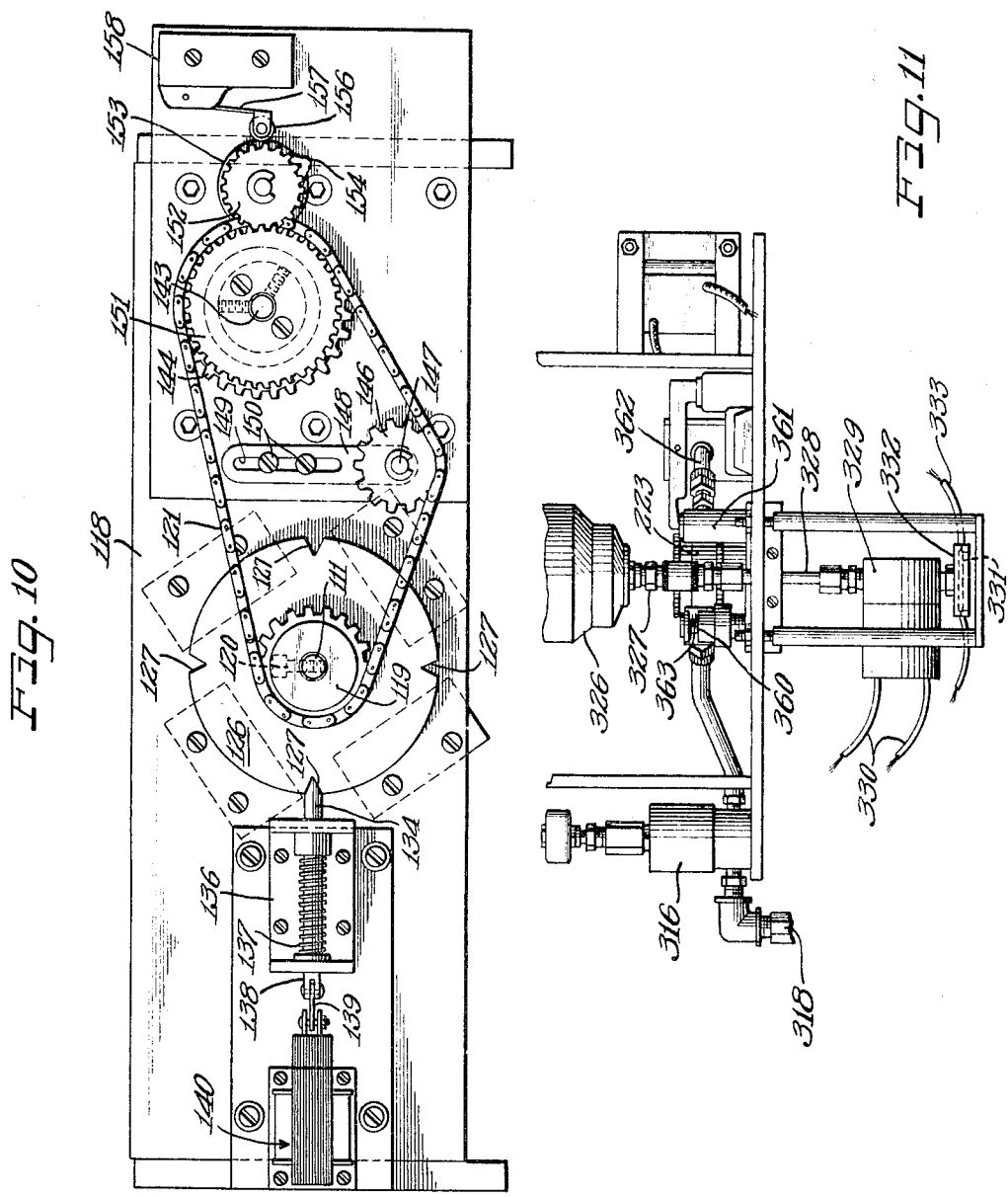

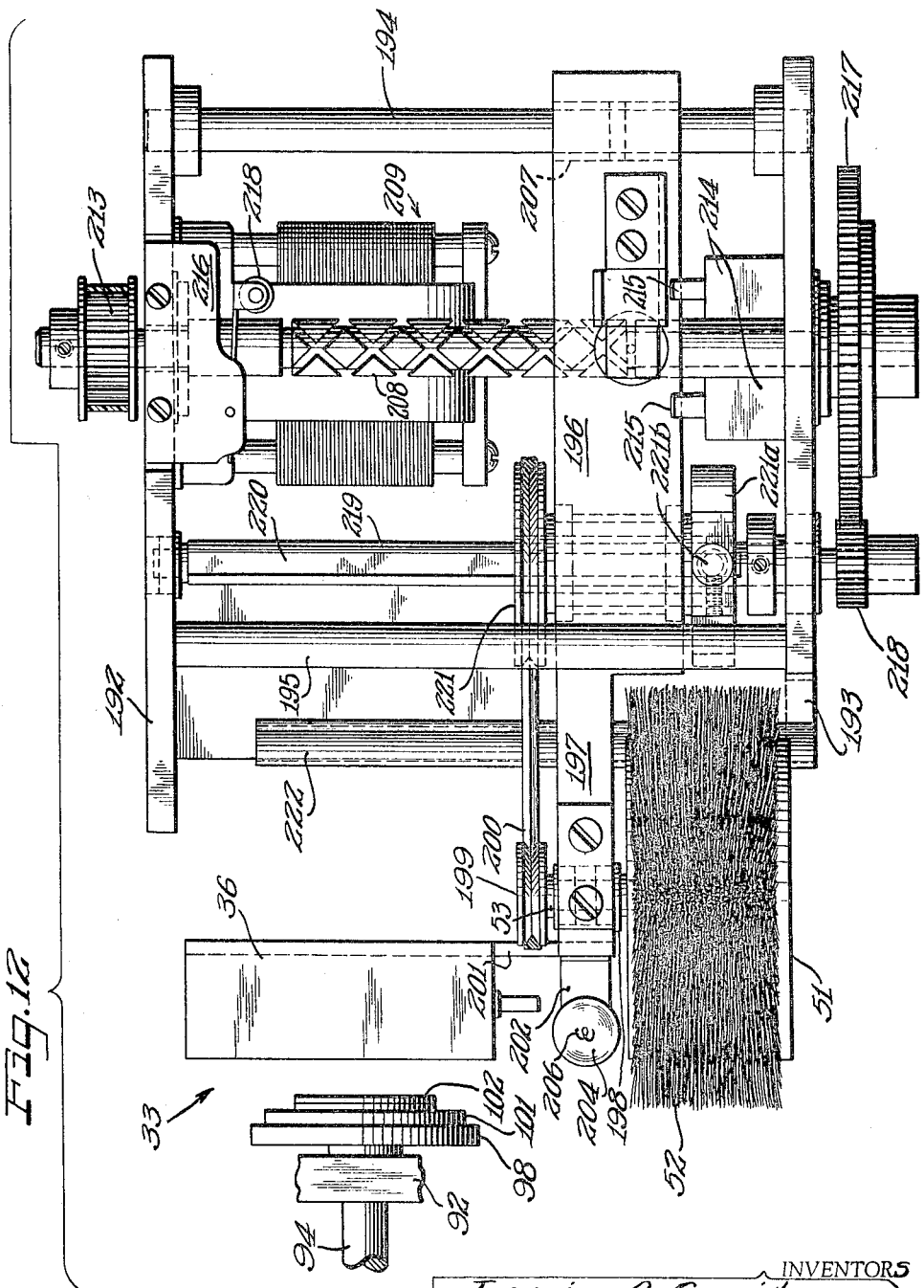

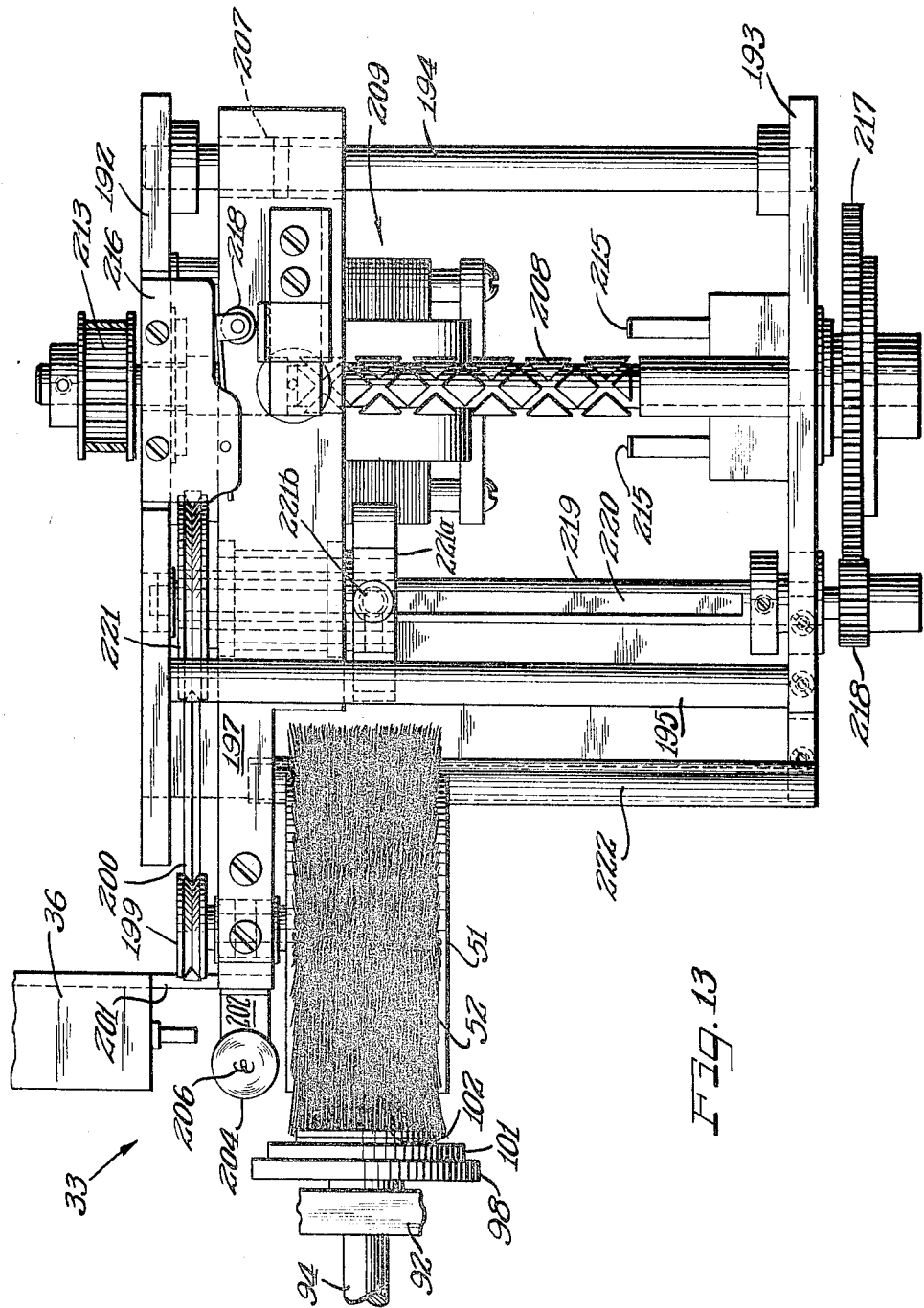

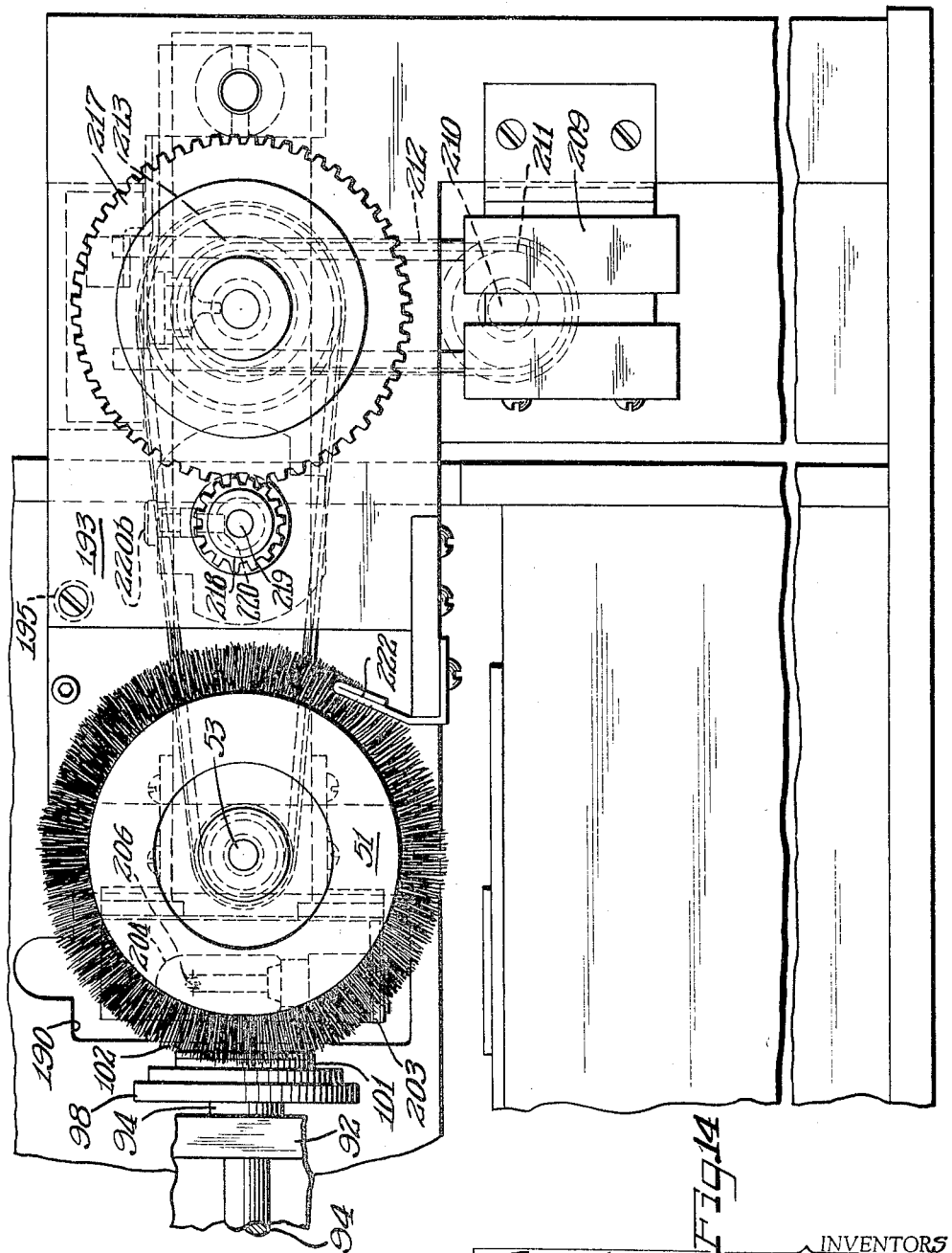

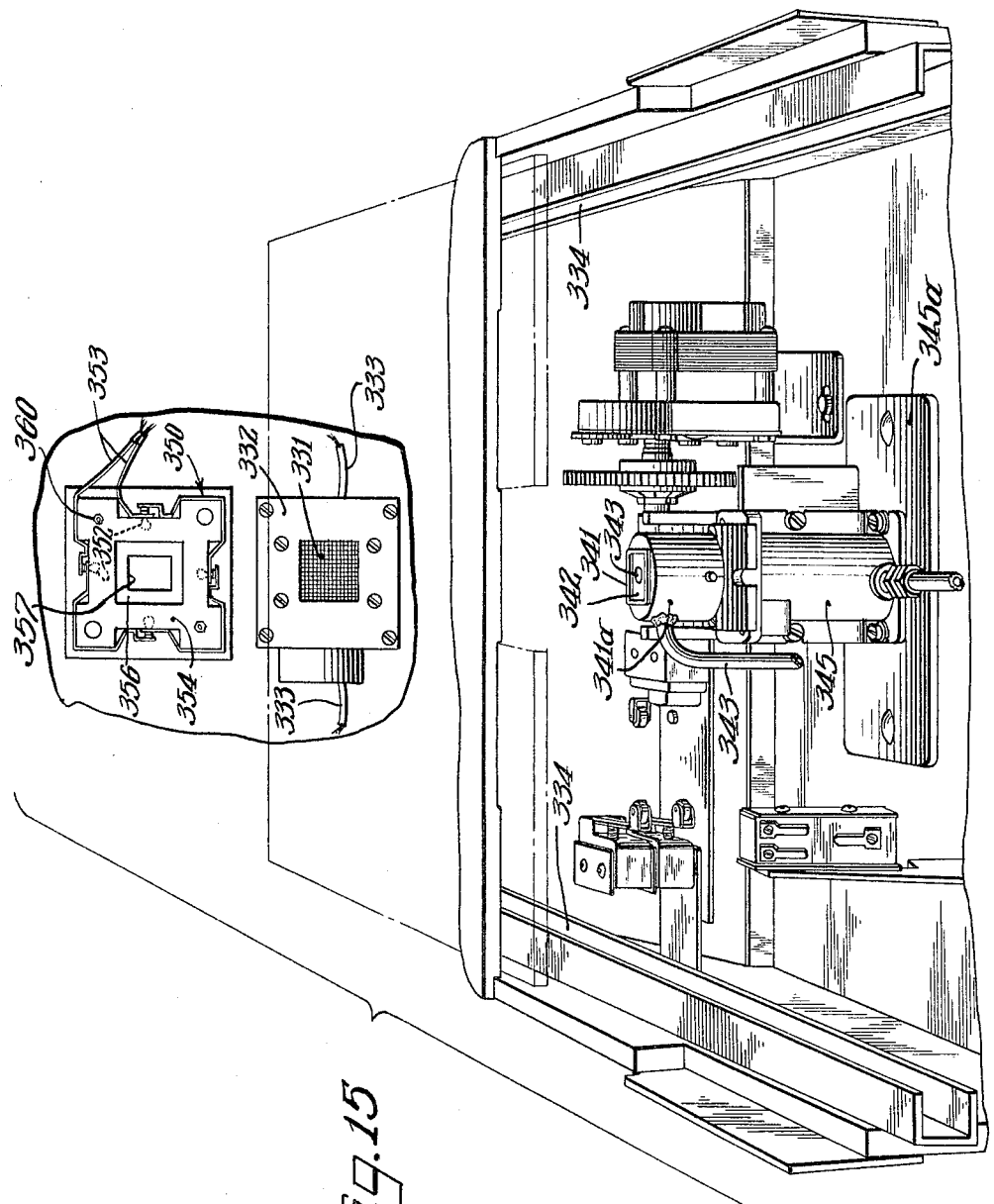

Nov. 8, 1966 L. A. SMITZER ETAL 3,283,680
MICROXEROGRAPHIC REPRODUCTION APPARATUS
Filed March 26, 1964 14 Sheets-Sheet 11

INVENTORS
Andrew Balint
William E. Bixby
Louis A. Smitzer
Adolph J. Gawin
Maynard C. Gross
ATTORNEYS

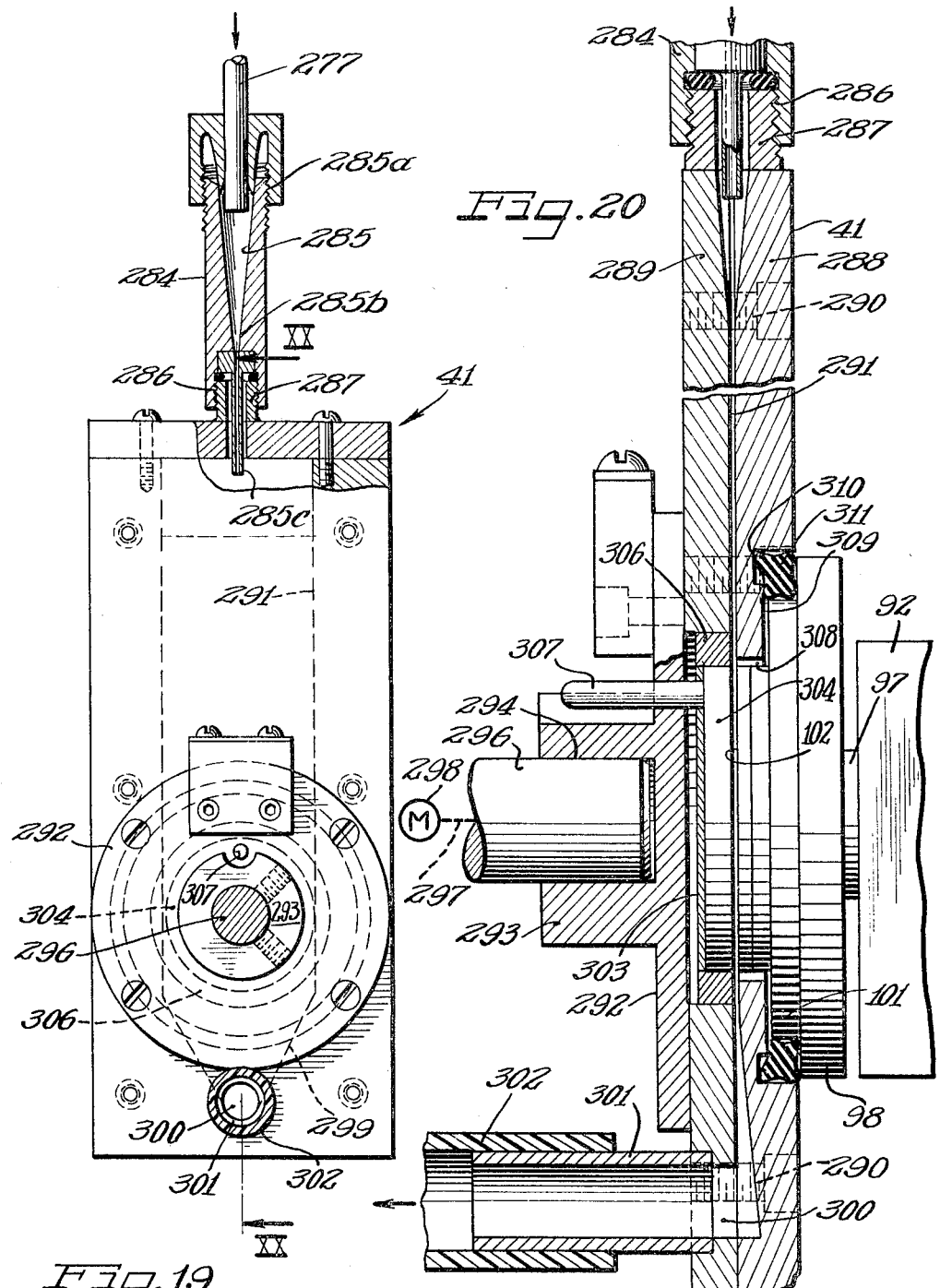

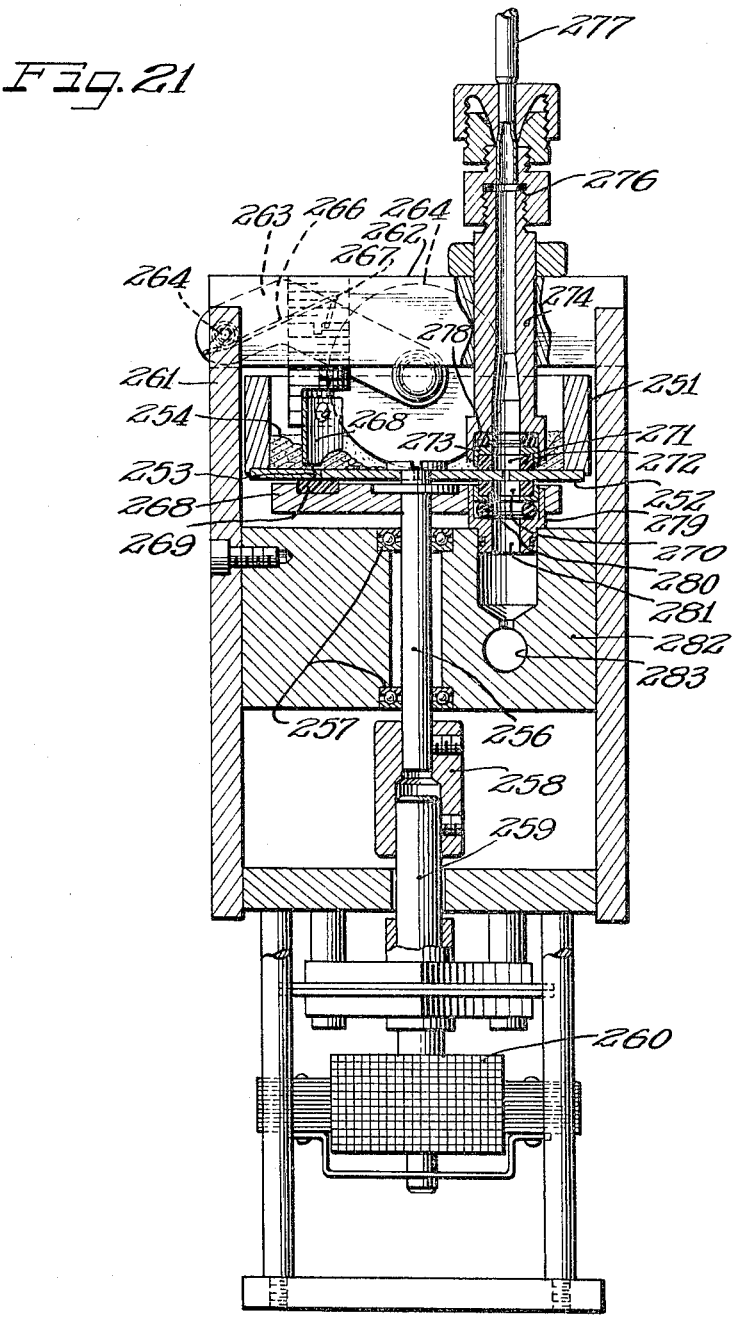

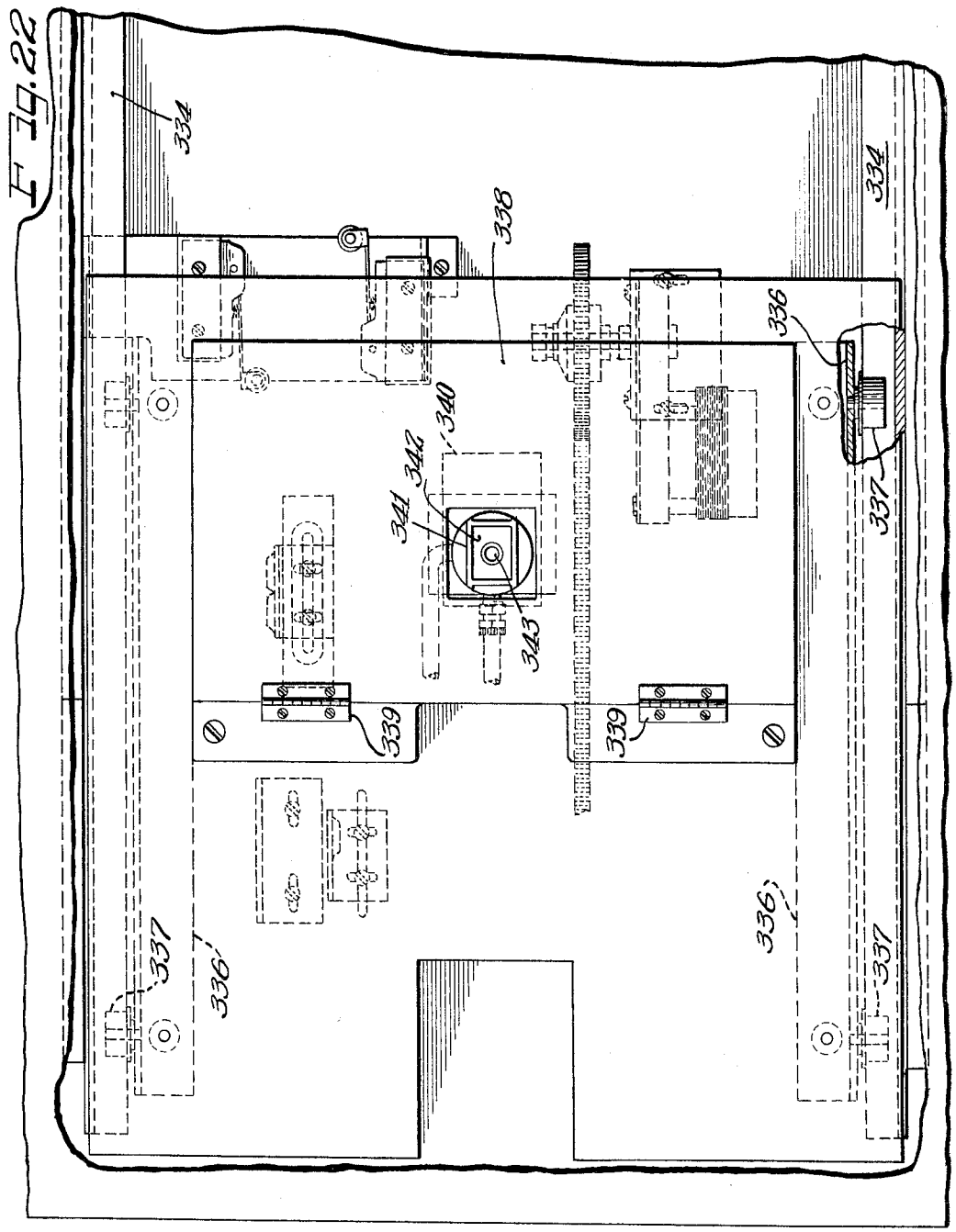

3,283,680
MICROXEROGRAPHIC REPRODUCTION APPARATUS

Louis A. Smitzer, Chicago, Adolph J. Gawin, Skokie, Maynard C. Gross, Chicago, Andrew Balint, Park Ridge, and William E. Bixby, Deerfield, Ill., assignors to Bell & Howell Company, Chicago, Ill., a corporation of Illinois
Filed Mar. 26, 1964, Ser. No. 354,976
41 Claims. (Cl. 95—1.7)

This invention relates generally to the fields of microimagery and electrostatography and more specifically relates to an improved method and apparatus for producing reduced size images of pages of books, periodicals or other original documentary material on the surface of an opaque or transparent stand size library catalogue card or business machine card or any convenient record media.

Numerous instances arise in the field of information storage and retrieval as well as in the field of information dissemination, for example, in school or research libraries, where the demand at any given time for a book, journal or other document vastly exceeds the number of copies that it is economically feasible for the information center, such as the library, to own. As a matter of fact, in many instances and in connection with the retrieval of some information, for example, in a research library, the one copy available may be the only copy extant. Further, to loan scarce documents for an appreciable time deprives others of the opportunity to examine the same and a temporary loan frequently may not be long enough for adequate study of the document.

It is contemplated by the present invention that a system be provided whereby reduced sized images of pages of books, periodicals or other originals may be produced on the surface of an opaque or transparent standard size library catalogue card or on a card of the type generally similar to a business machine card. This permanent reduced size copy can then be used for immediate or future references. Meanwhile, the original reference material may remain in a central file available for use by other persons.

In one exemplary procedure, following the principles of the present invention, the book or journal to be copied would be brought to a machine and placed face down on an exposure platen. An appropriate card adapted to receive the microimage would be positioned over a corresponding reference window. The machine would then be set into operation and within a short time, the card would be returned bearing a completed microimage of the original on a specifically aligned and selected position. The next page of the original would then be properly placed on the exposure platen and the card again positioned to receive the next image. That cycle would be repeated until all of the desired pages were copied. At a 12 to 1 reduction, a single 3 x 5 card could accommodate eighteen pages of information normally appearing on a maximum size document of 8½" x 11". Should opaque cards be used, both sides of the cards could be utilized, thereby doubling the capacity of the image card.

If business machine-type cards are employed, not only can normal sized title information be utilized, but it is also possible to provide a section of the card with coded information thereon, thereby making the record susceptible to automated retrieval.

Once reduced to microimage form, the techniques normal to conventional microfilm systems could be used in reading the images and in obtaining hard copy blowbacks from the microxerographic images.

In providing methods and apparatus for accomplishing the foregoing objectives by electrostatographic techniques, specific problems are introduced because of the necessity of maintaining the high standards associated with microimagery work. For example, conventional charging techniques followed in xerographic processes, for the purpose of placing an initial charge on a photoconductive surface, are not adequate in attempting to obtain the benefits outlined above. Accordingly, it is contemplated by the present invention that an improved charging arrangement be provided wherein a photoconductive surface carried on a supporting member will be rotated in the plane of its surface while contained within the charging field of an ion producing charging unit, thereby improving the uniformity of the charge prior to moving the photoconductive surface into the focal plane of an optical system for projecting a microimage thereon.

Moreover, it is further contemplated by the present invention to provide a combined charger-cleaner, whereby, prior to the improved charging arrangement referred to, the photoconductive surface will be thoroughly brushed and all residual materials removed therefrom.

Conventional xerographic techniques in developing microimages have also been completely deficient insofar as attainment of the objectives noted above is concerned. Accordingly, it is contemplated by the present invention to provide improved development techniques whereby an extremely finely divided particulate toner material can be dispersed throughout a fluid carrier directed in the form of a stream and projected in a transverse plane generally parallel to the photoconductive surface so that the particulate toner material will be deposited on the photoconductive surface to develop any image contained therein. Also, in accordance with the principles of the present invention, while such development is underway, the photoconductive surface is rotated in its image plane, thereby avoiding tears and streaks in the image which tears and streaks would be likely to occur if a stream of carrier fluid and toner material were flowed unidirectionally past an image plane and particularly at the leading and trailing edges of the image area.

It is further contemplated by the present invention that improved procedures of image transfer be provided, thereby permitting the effective addition of microimages to a copy medium such as an opaque or transparent card, whether the image be placed on the copy medium as a part of a total copying process, or whether the image be added as an isolated procedure and in order to either update the card or fill in missing information.

Thus, it is contemplated by the present invention that the copy medium be preconditioned locally, i.e., at a restricted area which is designed to accept the microimage. Such preconditioning can be effected by an electrically pulsed metering valve which provides an amount of liquid falling on an electrically pulsed heater in such a manner that the heat necessary to vaporize the liquid is exactly matched by the heater. The copy medium is then exposed to the vapor so produced in the vapor chamber, which vapor may constitute a solvent with respect to the surface of the copy medium, whereupon the developed image contained on the support member can be contact-transferred to the preconditioned image area on the card in order to provide a permanent microimage record.

It is an object of the present invention, therefore, to provide a microimagery system which can be utilized with improved electrostatographic methods and apparatus.

A further object of the present invention is to provide an electrostatographic reproduction method wherein an exposed photoconductive surface is rotated in its image plane or, in other words, on an axis of rotation intersecting the image plane, while developing the image, thereby avoiding tearing and streaking of the image.

Another object of the present invention is to provide an electrostatographic process wherein the photoconductive surface is rotated in its image plane within a charging field produced by an ion source, thereby improving the uniformity of charge on the photoconductive surface.

Yet another object of the present invention is to provide an electrostatographic method of reproduction wherein a stream of carrier and dispersed toner material is confined and directed closely adjacent an exposed photoconductive surface in a direction transversely of and generally parallel to the surface and while the surface is being rotated in its image plane.

Another object of the present invention is to provide an electrostatographic apparatus wherein an indexed head assembly will position the image plane of a photoconductive surface successively in an action plane at a first cleaning and charging station, a focal plane at an exposure station, a development plane at an image-developing station and a transfer plane at an image transferring station.

A still further object of the present invention is to provide an indexed machine which will automatically and sequentially prepare a completed microimage of document copy.

Many other advantages, features and additional objects of the present invention will become manifest to those versed in the art upon making reference to the detailed description which follows and the accompanying sheets of drawings in which a preferred structural embodiment is illustrated and from an understanding of which the principles of the novel methods contemplated by the present invention should be clearly understood.

On the drawings:

FIGURES 1, 2, 3, 4 and 5 represent somewhat schematic views illustrating the sequential steps of the electrostatographic process of microimagery contemplated by the present invention;

FIGURE 6 is a perspective view of a unitary machine capable of practicing the processes and embodying the inventive improvements described herein;

FIGURE 7 is an enlarged fragmentary view of the upper portion of the machine shown in FIGURE 6 with some of the parts broken away and with a front door panel opened to illustrate additional details of construction;

FIGURE 8 is a side view of the machine of FIGURES 6 and 7 and with the side panel wall removed to illustrate additional details of construction;

FIGURE 9 is an interior top plan view of one of the sub-assemblies incorporated in the machine of FIGURE 6 and illustrates details of construction of the head asssembly and also illustrates the relationship of various components of the machine;

FIGURE 10 is a fragmentary elevational view illustrating additional details of the indexing mechanism for regulating the operation of the head assembly and the indexing spider;

FIGURE 11 is a partial front view of the optical track assembly showing the solvent supply can and fusing assembly;

FIGURES 12 and 13 are top plan views of the combined charging-cleaning unit, FIGURE 12 showing the unit in charging position and FIGURE 13 showing the unit with the carriage moved into cleaning position;

FIGURE 14 is a side elevational view of the structure illustrated in FIGURES 12 and 13;

FIGURE 15 is a fragmentary perspective view with parts shown out of normal position and with parts removed to illustrate other components in detail;

FIGURE 19 is an elevational view with parts broken away and with parts shown in cross-section illustrating details of construction of the development chamber of the development apparatus incorporated in the machine of the present invention; and FIGURE 20 is a somewhat enlarged cross-sectional view taken on the plane of line XX—XX of FIGURE 19;

Figures 17, 18:
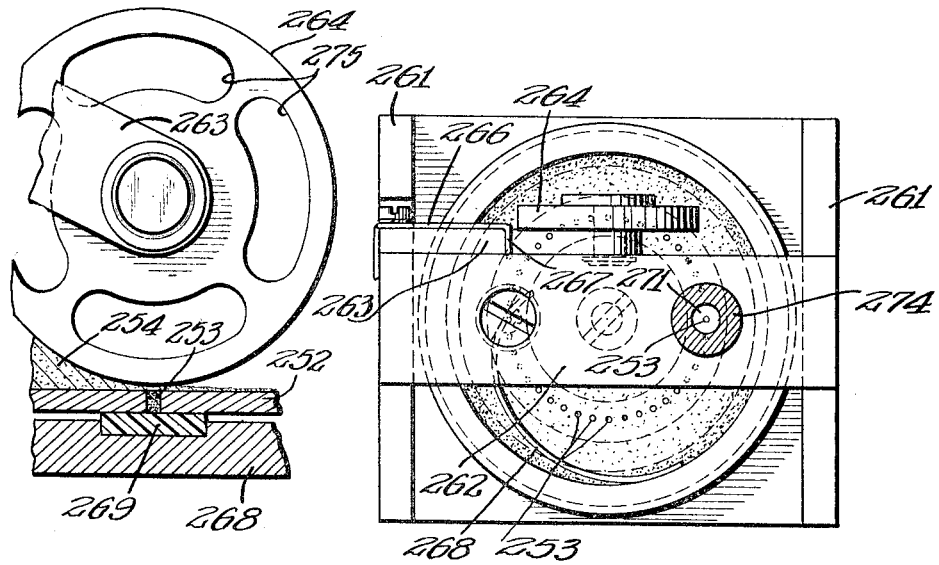
FIGURE 17 is a top plan view of a portion of the developing apparatus sometimes referred to as a powder cloud generator.
FIGURE 18 is a fragmentary cross-sectional view with parts shown in elevation showing additional details of the structure illustrated in FIGURE 17.

FIGURE 21 is a cross-sectional view showing further details of the organization and arrangement of the developing apparatus provided in accordance with the principles of the present invention; and FIGURE 22 shows the transfer mechanism with the card track at a transfer position, the optical track, indexing head and cleaning brush assembly all being removed for the sake of illustrating the parts with greater clarity.

As shown on the drawings:

In the general organizational aspect of the methods contemplated by this invention, an electrostatographic method is provided wherein a support member having a photoconductive surface thereon is sequentially moved through an indexed series of discrete steps. Thus, in FIGURE 1 there is illustrated a support member indicated generally at 30 having a photoconductive surface 31 disposed in an image plane. The support member 30 is carried on the end of a shaft 32 and constitutes a generally disk-shaped member disposed transversely relative to the shaft so that the shaft prescribes an axis of rotation which intersects the image plane of the photoconductive material 31.

In FIGURE 1, the photoconductive surface 31 is positioned in charging relation with an ion-producing source thereby to charge the surface 31. The ion-producing source is identified generally at 33 and herein is illustrated as taking the form of a corotron corona discharge unit having plural corona wires 34 enclosed within a shield 36 and across the opening of the shield is provided a control grid identified at 37.

After charging, the photoconductive surface 31 is moved into a second position at the focal plane of a lens system. The lens system is indicated diagrammatically at 38 and may constitute an optical apparatus which is arranged and constructed to project an image from a document positioned on a copy surface 39 onto the photoconductive surface 31. Suitable illumination means may be employed to effect such exposure and a pair of lamps are indicated in FIGURE 2 at 40.

The photoconductive surface 31 is then moved into a developing station at a third position which is indicated in FIGURE 3 wherein is illustrated somewhat diagrammatically a development chamber 41 having an inlet 42 and an outlet 43 arranged to be connected into a circuit so the development chamber 41 may be supplied with toner material which is deposited on the photoconductive surface 31 within the developing chamber 41 to develop the latent electrostatic image contained on the image plane of the photoconductive surface 31.

Next, the photoconductive surface 31 is moved into a transferring station illustrated at FIGURE 4. A card support is shown at 44 having a supporting surface 46 on which is positioned a copy medium such as a opaque or transparent card 47. As indicated by the arrows 48, the support 44 may be moved upwardly by a suitable actuating means 49 thereby to engage the copy medium 47 with the photoconductive surface 31 for the purpose of transferring the image from the surface 31 onto the copy medium 47.

As is indicated by the arrows shown at 50 in FIGURE 1 and FIGURE 3, it is contemplated by the present inhub 131 drivingly rotated by a rotatable shaft 132 connected to an electric motor shown generally at 133.

Referring specifically to FIGURE 10, it will be noted that the detent plate 126 cooperates with a detent pin 134 which is slidingly supported in a bracket 136 and which is normally spring-biased by a continuous biasing means 137 to engage against the periphery of the detent plate 126, thereby to be received in a corresponding detent recess 127 and locking the plate 126 against further rotation.

The rear end of the detent pin 134 has a coupling portion 138 connected as at 139 to the actuating plunger of a solenoid motor 140. Thus, upon energization of the solenoid motor 140, the detent pin 134 will be retracted and withdrawn from a corresponding detent recess and upon concurrent energization of the motor 133, the sleeve shaft 122 will be rotated to move the indexing spider 91 to the next quadrant. As soon as the movement of the spider 91 begins, the solenoid motor 140 can again be deenergized, whereupon the pin 134 will be biased by the spring 137 against the surface of the detent plate 126 for engagement with the next recess.

In this regard, the driving gear 130 may conveniently comprise a clutch-type driving gear and a resilient spring clutch 141 is shown in FIGURE 9 so that relative rotation can be effected between a gear 130 and the shaft 132 after the detent pin 134 has been received and seated in a corresponding detent recess 127.

As shown in FIGURE 9, another electric motor is provided as shown generally at 142 and a drive shaft 143 rotatably driven by the motor 142 rotates a sprocket wheel 144 engaged with the belt or chain 121.

In order to adjust the belt or chain tension of the belt or chain 121, there is provided an idler sprocket 146 journaled on a shaft 147 carried by a hanger bar 148 having an elongated slot 149 formed therein and by means of which the hanger bar 148 may be adjustably positioned by means of fasteners 150.

An additional gear wheel 151 is connected to the shaft 143 axially outwardly of the sprocket wheel 144 and meshes with a smaller gear wheel 153 having a control disk 153 co-rotatable therewith and provided with an actuator lug 154 projecting radially outwardly for engagement with a cam wheel 156 carried on the end of a switch actuator arm 157 associated with a control switch shown generally at 158.

Figure 16:
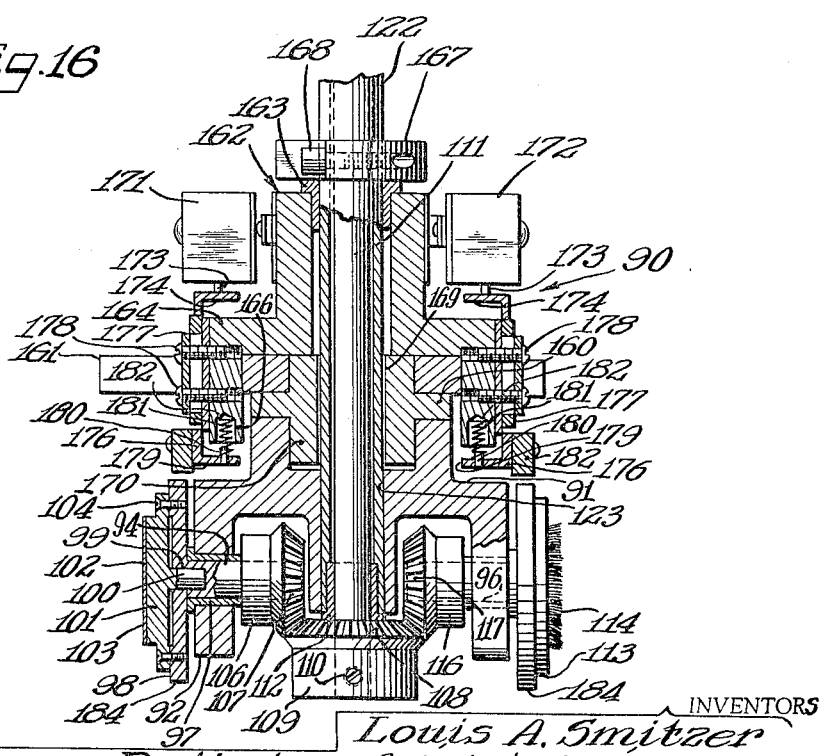
FIGURE 16 is a cross-sectional view with parts shown in elevation illustrating details of the indexing spider and head assembly.

As shown in FIGURES 9 and 16, additional circuit controlling and actuating components are associated with the head assembly. Thus, there is shown a front wall 161 forming a part of the machine frame and to which is connected a bushing 162 having a radial flange 164 and an axial flange 166. At the end of the bushing 162, a sleeve bearing 163 is interposed between the bushing 162 and the sleeve shaft 122, thereby to provide a bearing support for the sleeve shaft 122.

A bearing 160 is also provided which is T-shaped in cross-section and has a through opening 169 for the sleeve shaft 122 and a bearing surface 170 for the indexing spider 91. A shoulder clamp 167 is connected by means of fasteners 168 to the sleeve shaft 122 directly adjacent the bearing member 163.

As shown in FIGURE 16, a pair of control switches 171 and 172 are carried on the bushing shown generally at 162 and each has a switch actuator 173 engageable with an offset lug 174 on a slide actuator 176. The slide actuator is slidably carried by a positioning bracket 177 held on the axial flange 166 by a pair of fasteners 178. The slide 177 includes a lug 179 at the end opposite the lug 174 and to the lug 179 there is connected a locating pin 180 bottoming a continuous biasing means such as a coil spring 181, the other end of the coil spring 181 being received in a recess 182 formed in the end of the axial flange 166. Thus, the slide 177 is normally biased away from each corresponding actuator 173 of the control switches 171 and 172.

Attached to the end of each slide 177 adjacent the lug 179 is an enlarged nose 182 and, as shown in FIGURE 9, the nose 182 has an apical portion 183 with camming surfaces diverging away therefrom which camming surfaces are adapted to be engaged by the adjoining edge surfaces 184 formed on the disks 98 and 113.

Since the slides 176 are situated to be engaged by the actuating surfaces 184 when the head assembly has positioned the photoconductive surface 102 in the exposure station and in the transfer station, it will be apparent that the actuation of the corresponding switches 171 and 172 by the slide 176 will condition corresponding elements of the control circuitry to stop rotation of the shaft 111 and hence of the disks 101 and 113.

Referring now to FIGURES 12, 13 and 14, in conjunction with FIGURE 9, it will be noted there is provided a cleaning and charging mechanism. First of all, an opening 190 is formed in the wall 161 through which a corona charging unit 191 may be moved when the combined charging and cleaning unit is reciprocated relative to the head assembly 90. In this regard, there is provided adjacent the wall 161 a frame assembly including side members 192 and 193 carrying in extended relation therebetween a track assembly on which is supported a carriage 196. The side members are spaced by a front spacer or bracket member 195. A rear member 194 functions both as a spacer and as a track for the carriage 196. At the front end of the carriage 196 there is a projecting arm 197 in which is carried a bearing assembly 198 journaling a shaft corresponding to the shaft 53 shown in FIGURE 5 in diagrammatic form. The shaft 53 has a hub 51 and radially outwardly projecting bristles 52. At the other end of the shaft 53 there is provided a pulley wheel 199 which is engaged by a driving belt 200, thereby to rotatably drive the cleaning brush.

The arm 197 further carries a bracket 201 to which is connected the shield corresponding to the shield 36 of FIGURE 1 and inside of the shield are provided the corona discharge wires corresponding to the corona charging wires 34 of FIGURE 1 (see FIGURE 9) and the control grid 37.

The arm 197 also carries a bracket 202 on which is positioned in a forwardly extending relation between the shield 36 and the brush 51, a receptacle socket 203 in which is received a lamp bulb 204 having a filament 206, thereby providing an incandescent light source.

The carriage 196 is supported for reciprocation on the rear track 194 by suitable slide bearing means 207 and is further supported in slidable relation with a shaft 219. Additionally, the carriage 196 carries an actuator nut which is engageable with the reversely cut threads of a reversing screw 208 rotatably journaled by suitable bearings carried in the side supports 192 and 193. The reversing screw 208 is rotatably driven by an electric motor shown generally at 209. As shown in FIGURE 14, the motor 209 has a drive shaft 210 to which is connected a pulley wheel 211 over which is trained a timing belt 212 for engagement with a toothed pulley hub 213 connected on the end of the reversing screw 208.

Suitable control switch means for effecting operation and reversed reciprocation of the carriage 196 include switch housings shown at 214 and 216 and having actuator arms 215 and 218 extending therefrom for engagement with adjoining portions of the carriage 196 during movement thereof.

The reversing screw 208 carried on the end thereof a spur gear 217 which meshes with a gear 218 carried on the end of a shaft 219 journaled for rotation in bearings carried by the side supports 192 and 193. The shaft 219 has a keyway 220 formed thereon, thereby to cooperate with a pulley wheel 221 which is slidable along the length of the shaft 219 but which is co-rotatable with the shaft 219. The pulley wheel has a hub which extends axially and which is engaged with a clamp member 221a retaining a driving pin 221b cooperable with the keyway 220.

vention that the photoconductive surface 31 be rotatably driven about an axis of rotation intersecting the image plane of the photoconductive surface 31 during the charging step and during the developing step, thereby to improve the uniformity of the charge and to develop the microimage without tearing or streaking of the image. Further, as illustrated in FIGURE 2 and FIGURE 4 where no comparable arrow is provided in connection with the support member 30, it is contemplated that the photoconductive surface 31 will be retained in stationary condition during the steps of exposure and transfer in order to insure accuracy in the production and transfer of the microimage.

In FIGURE 5 there is illustrated somewhat diagrammatically a supplemental step which takes place at the first station and which is performed after the transfer step. As illustrated therein, a brush 51 having radially projecting bristles 52 is rotatably carried on a shaft 53. The bristles 52 engage the photoconductive surface 31 and operate to clean the surface, removing all residual toner material and any other dirt particles which may be on the photoconductive surface 31, thereby always leaving a clean surface at the end of a cycle.

It is contemplated that there be provided in diametrically opposite relation to the support member 30 a support member indicated generally at 54 and having a brush formed with axially projecting bristles 56 which support 54 is carried on a shaft 57. The brush 54 is used to clean an electrode 58 positioned in the development chamber 41, thereby conditioning the development chamber 41 for the next cycle of development when the photoconductive surface 31 moves to the developing station at the third position of the electrostatographic cycle.

Having thus described the general method organization contemplated by the present invention, an exemplary apparatus capable of practicing the novel methods contemplated herein will now be described. From the description of the detailed apparatus, other method aspects of the present invention will be clarified.

In FIGURE 6, there is shown a completely integrated machine shown generally at 60 and comprising generally a stand 61 supported on roller wheels 62 journaled in casters 63. On top of the stand is provided an outer casing having side walls 64, a front wall 65 and a control console 66 on which is positioned a plurality of electric push buttons for controlling the electrically operated components of the machine. Thus, there is an "off" button 67, an "on" button 68, a "print" button 69 and an indicator "lamp" 70 which lights up to indicate a malfunction.

A card track enclosure projects outwardly from the front wall 65 and includes an upwardly tapered bottom wall 71 terminating in a front portion 72. There are also oppositely disposed side walls, one of which is shown at 73 and a hinged cover 74 may be lifted to place a copy medium or card onto the card track. The front wall 65 has a lower hinged door 76 which is shown swung to an open position in FIGURE 7, thereby revealing a magnetic latch means 77 for keeping the door 76 normally latched in closed position.

At the top of the machine, there is formed what appears to be a rostrum or dais and which is adapted to support a book or journal or any other document or article to be copied with respect to an exposure platen 80. The exposure platen 80 constitutes a reference window for an optical system contained within the machine and arranged in coplanar alignment therewith is a support surface provided by a left-hand surface 81 and a right-hand surface 82. As will be evident from inspecting FIGURES 6 and 7 of the drawings, the exposure platen 80, together with the surfaces 81 and 82 are disposed in an inclined relation, there being a ledge-forming abutment provided by an offset wall 83 intersecting the plane of the surfaces 80, 81, 82 and terminating in a downwardly turned surface-forming member 84. The upper portion of the machine is flanked by side walls, one of which is shown at 86.

The general structural organization of the machine 60 is shown most clearly in FIGURES 9, 10 and 16. Thus, supported in the main machine frame is an indexing head assembly shown generally at 90 and including an indexing spider 91 having a yoke formed with a first arm 92 and a second arm 93 spaced in parallel relationship with one another and each journaling a shaft 94 and a shaft 96, respectively. To journal the shaft an appropriate sleeve bearing 97 is interposed between each respective arm and the corresponding shaft.

On the outermost end of the shaft 94, there is formed a radially outwardly extending disk-type support member which is concentrically disposed in a transverse plane and centrally intersected by the axis of rotation of the shaft 94. More specifically, the disk-like support member comprises an integral flange 98 extending outwardly from the shaft 94 and having the face thereof recessed at 99 to receive a locating pin 100 of a second disk-shaped member 101 which presents a flat radial surface 102 on which is coated a layer of photoconductive material. In one form of the invention, selenium is a satisfactory form of photoconductive material and a layer of selenium may be coated on the surface of the disk in sufficient thickness to form an image plane in which a latent electrostatic image may be formed and providing a surface on which the latent image can be developed.

To place the disk 101 in connected-together assembly with the disk-shaped flange 98, a plurality of fasteners 104 are provided.

On the inner end of the shaft 94, there is connected a beveled gear having a hub 106 on which is formed a gear head 107. The teeth of the gear head 107 are engageable with the matching gear teeth on a gear head 108 carried on a hub 109 fastened by a set screw 110 to a shaft 111 extending through the spider 91 and the indexing head means 90 for a driven connection with a drive motor. The shaft 111 is journaled in the sleeve 122 by means of a bearing sleeve 112.

The structure associated with the shaft 96 is of comparable detail and provides a disk-shaped support member 113 having a brush providing axially projecting bristles 114 on the outermost end of the shaft 96. On the inner end of the shaft, there is provided a beveled gear having a hub 116 and a gear head 117 provides bevel teeth which are in mesh with the corresponding teeth on the gear head 108, thereby to be likewise driven by the shaft 111 concurrently with the photoconductive surface.

The shaft 111 extends towards the rear of the machine and projects through a wall 118. A sprocket 119 is fastened to the shaft 111 by means of a setting bolt 120 and the sprocket is driven by a chain 121, thereby to selectively rotate the shaft 111 whenever it is desired to concurrently rotate the photoconductive surface 102 and the brush 114.

A sleeve 122 is fixed for co-rotation with the spider 91 and is seated in a centrally disposed opening 123 formed in the spider 91 so as to be co-rotatable therewith. The sleeve 122 extends through the rear wall 118, being journaled therein for rotation and has connected thereto a hub 124 to which is fastened an indexing plate 126 having four detents cut in the peripheral surface thereof, as indicated at 127. The four detents 127 are circumferentially spaced, thereby to provide equal arcs between them and prescribing four separate indexing positions corresponding to four separate quadrants of the generally circular traverse of the indexing plate 126 and the sleeve-type shaft 122 and, in turn, the rotatable indexing spider 91.

At an intermediate point along the length of the sleeve shaft 122 there is connected a driving gear having a hub 128 and a peripherally toothed gear wheel 129 meshing with a peripherally toothed gear wheel 130 carried on a The pulley belt 200 engages the pulley 221, thereby providing a source of driving power for the brush 51 whenever the carriage 196 is reciprocated.

At the front end of the assembly there is provided an upstanding flange 222 which engages the bristles 52 of the brush 51, thereby to mechanically agitate the bristles so that any residual materials carried on the bristles will tend to be removed therefrom before engagement of the bristles 52 with the photoconductive surface 102 of the selenium disk.

In operation, when the indexing head moves the photoconductive surface 102 of the selenium disk into the charging and cleaning station, the photoconductive surface 102 is initially positioned as shown in FIGURE 12 where it is in register with the corotron type corona discharge unit exemplified by the shield 36 and shown generally at 33. While in this position, the motor 209 is energized, thereby driving the reversing screw 208 and the carriage 196 will be reciprocated between the supports 192 and 193. During such reciprocation, the incandescent light source or bulb 204 will be energized, thereby completely exposing the photoconductive surface to light and removing any residual electrostatic charge patterns in the photoconductive surface. The bristles 52 will mechanically engage the photoconductive surface 102 and will effectively remove any particulate particles of developer composition. Thus, as shown in FIGURE 13, the light source 204 has already gone by the photoconductive surface 102 and the bristles 52 are shown in physical engagement with the photoconductive surface 102. Throughout the traverse of the brush 51, the bristles are engaging the upstanding flange 222, thereby keeping the bristle surface of the brush clean. When the carriage 196 reaches the limits of its travel, it automatically reverses and the brush is returned to the position of FIGURE 12 with the corotron charging unit 33 in register with the photoconductive surface 102.

The shaft 111 can also be rotated concurrently with energization of the motor 209, thereby rotating the selenium disk 101 during the cleaning and charging operation and thereby promoting the effectiveness of the physical removal of residual particulate materials and also facilitating the promotion of a uniform charge on the photoconductive surface 102.

In FIGURES 7 and 8, the optical track of the lens system necessary to the operation of the exposure station can be observed. Thus, the document material to be recorded is placed on the exposure platen 80 and is illuminated by light source means 40 so that the image will be illuminated and transmitted via aligned mirrors to a focusing lens shown generally at 223. It will be noted the focusing lens 223 is positioned on a generally vertical axis and includes adjustment means 224 so that documentary material placed on the exposure platen 80 can be focused on an image plane corresponding to the photoconductive surface 102 positioned immediately subjacent the lens 223 when the head assembly is indexed to position the photoconductive surface 102 at the exposure position.

Following exposure of the image through the optical track, the head means is indexed to position the photoconductive surface at the developing station. It is contemplated by the present invention that development be effected by a powder cloud technique and in this connection reference may be made to FIGURES 17–21 wherein there is shown a reservoir bowl 251 having generally cylindrically disposed side walls open at the top but closed at the bottom by a plate 252 having a circumferential row of metering apertures 253 selected to be of a predetermined size.

Thus, the bowl 251 forms a cup-shaped reservoir in which may be placed a supply of particulated material such as carbon particles shown at 254 ground to a requisite degree of fineness required for accuate metering through the apertures 253.

In order to rotatably drive the plate 252 there is provided a shaft 256 journaled in spaced bearings 257 and coupled as at 258 to a drive shaft 259 rotatably driven by a motor 260.

The bearings 257 are carried in a framework including side walls 261 joined by a cross piece 262 at the top of the framework. A crank arm 263 is pivotally connected as at 264 to one of the side walls 261 and journals at the free end thereof a roller wheel 264 disposed to have its peripheral surface rotatably engage the upper surface of the plate 252 at a track location corresponding to the row of annular metering apertures 253.

A torsion spring 266 is fastened to the pivotal connection 264 and engages the crank arm 263 as at 267, thereby to continuously bias the roller wheel 264 towards the plate 252.

A doctor blade 268 is carried by the cross piece 262 and is spaced from the bottom of the bowl 251 above the level of the plate 252, thereby to re-distribute the particulate material 254 within the bowl as rotation occurs.

Subjacent the plate 252 there is provided a flat plate 268 carrying an annular ring of sealing material 269 which engages the bottom of the plate 252 at the apertured area thereof in order to prevent particulate material from passing through the metering apertures 253. At one point along the circumferential extent of the sealing material 269 there is formed an opening 270 which opening is disposed to lie in register with one of the metering apertures 253, as well as with an opening 271 formed in a gasket 272 carried in a retainer 273 positioned in the end of a conduit 274 carried by the cross piece 262 and connected by suitable coupling means as at 276 to a conduit 277. A good seal is provided between the retainer 273 and the conduit 274 by means of an "O" ring 278. The plate 268 also carries a retainer 279 and a seal is provided by an "O" 280. The retainer 279 has a passage 281 formed therein and a block 282 has passage means shown at 283 formed therein.

As is clearly shown in FIGURE 18, as the plate 252 and the roller wheel 264 move relative to one another, the metering aperture 252 is charged with a predetermined quantity of particulate material 254. The charge is uniform because the wheel 264 is loaded by a continuous biasing means and an adequate supply of particulate material 254 is maintained in register with the annular row of apertures 253 by the doctor blade 268. Further, the sealing material 269 backs up the apertures 253 so that each metering aperture 253 received a predetermined quantum or metered supply of particulate material.

In this regard, the roller wheel 264 is provided with a series of axial openings 275 facilitating flow-through distribution of material on opposite sides of the wheel and enhancing the filling of the apertures 253.

As each aperture 253 comes in register with the openings 270 and 271, a pressurized carrier stream is directed through the aperture 253, thereby admixing the particulate material contained within the metering aperture 253 into the carrier stream.

Thus, the mixture of the material in the stream will be directly proportional to the rate of rotation of the plate 252, a variable which can be very closely regulated by controlling the operation of the motor 260.

The developing unit 41 (FIGURES 19 and 20) constitutes a pair of connected together plate members 288 and 289 connected together by fasteners 290 and prescribing therebetween a development chamber 291 of a size carefully proportioned to channel the carrier stream in the form of a laminar flow stream.

The plate member 289 has fastened thereto a bracket member 282 which has a boss 293 recessed as at 294 to receive a stem 296 of a plunger. The plunger 196 is shown connected as at 297 to a motor 298, thereby to be reciprocated toward and away from the spider unit of the head assembly. A guide roller 45 carried on the unit 41 by a bracket 45a steadies the unit against the wall 161. The motor shown diagrammatically at 298 in FIGURE 20 is shown in FIGURE 9 and comprises an air cylinder 298a having a double entry air inlet 298b and 298c for actuating a piston 298d connected to the plunger 296.

As will be evident from an inspection of FIGURES 19 and 20, the chamber 291 is provided with straight parallel walls for a greater part of its length, however, the side walls converge inwardly as at 299 terminating in register with an opening 300 formed in the plate 289 and a tube 301 in said opening 300 is connected to a conduit 302, which conduit 302 leads to a suitable recovery system for recovering unused particulate material.

Along the length of the chamber 291, there is formed an opening 303 in the plate member 289 closed by the member 292 and in that recess 303 is located an electrode 304 seated in an insulator ring 306. The insulator ring 306 and the electrode 304 are positioned to provide an unbroken surface for the chamber 291 along the length thereof. The electrode 304 may be connected to suitable control circuitry by means of a contact member 307 which projects rearwardly through the member 292.

The plate member 288 has an opening 308 which is counterbored as at 309 and which counterbore 309 is additionally recessed as at 310 to receive a sealing gasket 311 formed with a convoluted surface, thereby to provide compressible bearing and sealing surfaces for engaging against the adjoining disk surfaces 98, 101. As shown in FIGURE 20, when the indexing spider 92 positions the photoconductive surface 102 at the development station, the motor 298 is actuated and moves the development chamber into engagement with the disk members so that the disk members actually cap the development chamber and the photoconductive surface 102 is not only sealed within the development chamber by the engagement of the sealing member 311 with the disks 98, 101, but the photoconductive surface 102 actually forms an extension of the wall surface of the chamber 391 and is positioned directly opposite the electrode 304 so that a laminar flow of the carrier stream past the photoconductive surface 102. By controlling the charge on the electrode 304, the particulate material will be attracted to the charge pattern appearing on the photoconductive surface 102 and will render such charge pattern visible as a developed microimage. Moreover, by rotating the photoconductive surface 102 in its own plane during such development, tears and streaks in the image area will be avoided.

Referring to FIGURE 8, the powder cloud generator mechanism just described is shown in its operational environment and it will be noted that there is provided an electrically operated valve 319 having control wires shown at 320 and connected to a source of compressed air via a conduit 321. The compressed air supplied to the conduit 321 is preferably dehydrated by passing the same through a dehydrator apparatus containing a suitable desiccant. Accordingly, the valve 319 controls the admission of a very dry supply of air to a conduit 322 connected to the passage 283 of the powder cloud generator whereupon the air passes through the passage 281, the opening 270 and through the selected apertures 253. The comminuted material is then admixed with the carrier stream and passes through the opening 271 and the conduit 274 and into the conduit 277.

The comminuted material in the air stream is carried by the conduit 277 to a fitting 284 connected to the development chamber 41 coupled as at 286 to the inlet 287. It will be noted that the fitting 284 is particularly characterized by an internal passage 285 having a mouth 285a which is wider than the conduit 277 and having an outlet end 285b which is greatly restricted to a size less than the conduit 277. The final discharge into the development chamber 291 is effected by an elongated tube shown at 285c. Thus, the operation of such components and the configuration of the passage provided thereby is to break up and disperse the toner particles so that a through laminar flow occurs within the development chamber 291.

The final transfer operation and the means provided for effecting the same are best illustrated in FIGURES 11, 15 and 22. As shown in FIGURE 11, a can 326 contains a supply of liquid solvent and is coupled as at 327 to a conduit 328 leading to an electrically pulsed metering valve 329 having electrical connections 330 for integrating the electrically pulsed metering valve 329 into a control circuit.

The metering valve provides an amount of liquid solvent onto an electrically pulsed heater shown at 331 contained within a heating chamber 332 and having electrical connections 333 for pulsing the heater 331 in properly timed relation. The heat necessary to vaporize the liquid is exactly matched by the heat input to the heater 331. The two pulses, one for the valve 329 and the other for the heater 331 may be simultaneous or may be displaced in phase. The repetition rate of the pulse pair is set according to the vapor demand. There is no temperature rise or cooling in the vapor chamber. The heater 331 may take the form of a woven graphite cloth which soaks up the liquid solvent to be vaporized.

Referring to FIGURES 15 and 22, a pair of tracks 334 are spaced apart from one another and project outwardly from the machine into the card track enclosure prescribed by the walls and cover 71–74. Riding on the tracks 334 is a carriage 336 supported by wheels 337. The carriage has a door 338 hinged as at 339 and when the door 338 is lifted upwardly, the card to which the image is to be transferred is placed in the receiver 340 in a prealigned position, whereupon the carriage will move the same first under the vapor chamber 332, with which the carriage is aligned to position the card with a slight clearance. Just prior to actual physical transfer of the image to the card, the surface of the card is preconditioned by the vapor solvent.

Next, the card is moved into register with the cylinder 345 fastened to the bed of the machine as at 345a. Subjacent the receiver 340 is a rectangular seal 341 prescribing a recessed area 342 into which is directed a stream of air via a conduit 343. A plunger 341a carrying the seal 341 is moved upwardly by a pneumatic biasing force so that the card is gently but firmly engaged with the photoconductive surface 102 by a curtain of air, thereby uniformly pressing the preconditioned card surface against the photoconductive surface and transferring therefrom the developed image.

Having completed an entire cycle, the machine is now ready to begin a new cycle and the photoconductive surface 102 is moved to the cleaning and charging station. At this point, the indexing spider has positioned the brush 114 on the disk 113 in register with the developing unit 41. The motor 298 actuates the plunger and the brush 114 engages its bristles against the electrode 304 while a clean stream of air is discharged through the conduit 284. This has the effect of cleaning the development chamber 291 in the critical areas occupied by the photoconductive surface 102.

Because the photoconductive surface is a round disk and most images would appear in rectangular form, it is contemplated by the present invention that a residual burn out of the non-image areas be effected during the exposure step. In order to accomplish that function, additional structure is provided which can be most clearly understood by referring to FIGURES 11 and 15. A light pipe 350 is provided which includes a flat piece of plastic 351 recessed to receive spaced bulbs 352 energized through conductor wires 353. The plastic is translucent but is blacked out by an opaque coating at 354, thereby leaving a center clear masking area 356 surrounding an opening 357. The masking area 356 transmits rays of light by edge lighting.

In order to place the light pipe in accurate registry with the photoconductive surface 102, the light pipe is carried for reciprocation by guide pins 360 and is actuated by a piston motor 361.

A valve 316 (FIGURE 8) receives compressed air via a conduit 318 and the valve is motor operated, conductor wires being shown at 317, thereby controlling the admission of air to a conduit 362 leading to the piston motor 361. It will be noted in FIGURE 11 that a spring 363 surrounds the guide pin. Thus, the light pipe 350 is actuated downwardly and engages the photoconductive surface snugly so the edge lighting will burn out the residual charge and provide a clear sharply framed image.

Although not described in complete structural detail, it will be appreciated that all of the components set forth hereinabove are automatically operated by appropriate control circuitry and the entire operation proceeds through a sequenced program upon simply actuating the buttons on the control panel of the machine. Thus, in summary, a document is placed on the exposure platen 80 whereupon the machine will successively move the photoconductive surface 31 or 102 into a charging station and a uniform charge is placed on the photoconductive surface by a corotron charging unit 33. In this position, the photoconductive surface is rotated in its plane in order to improve the charging action.

Next the photoconductive surface is retained in stationary position at an exposure station at the image plane of the lens system. Following exposure and residual non-image area burn out, the selenium disk is indexed to the next quadrant, whereupon the disk caps an opening of the development chamber 41 and a laminar flow of carrier fluid and developer powder is exposed to the disk for the purpose of developing the image appearing on the disk in the form of a charge pattern. The disk is rotated during development to improve the development action and avoid tears and streaks in the microimage.

Lastly, the disk is moved to the fourth quadrant consisting of a transfer station. A coated card is preconditioned by an electrically pulsed vapor generating device and the developed image is transferred to the preconditioned area on the card by controlled pressure contact.

The disk is then physically engaged with the bristles 52 of the brush 51, thereby to remove residual particles of developer composition and leaving the disk clean for the next operation. The electrode 304 is similarly cleared and conditioned for the next operation.

Although minor modifications might be suggested by those versed in the art, it should be understood that we wish to embody within the scope of the patent warranted hereon, all such modifications as reasonably and properly come within the scope of our contribution to the art.

We claim as our invention:

1. The method of electrostatographic reproduction which includes the steps of
    holding a flat photoconductive surface stationary during the exposing step to produce a latent electrostatic image on the surface,
    and rotatably moving the exposed photoconductive surface on an axis of rotation intersecting the surface, and simultaneously developing the image by flowing across said exposed photoconductive surface a stream of carrier fluid and particulate material with its boundary at said photoconductive surface and in a direction generally normal to said axis of rotation,
    thereby avoiding tearing and streaking of the image.

2. The method of electrostratography which includes sequentially moving a photoconductive surface through an indexed series of discrete steps including,
    (a) positioning the surface in a first position in charging relation with an ion-producing source to charge the surface,
    (b) moving the surface into a second position at the focal plane of an optical lens system,
    (c) projecting and exposing a microimage through the lens system onto said surface at said second position to form a latent electrostatic image,
    (d) moving the surface into a developing station at a third position,
    (e) depositing a toner material on the surface at said third position to develop the image,
    (f) moving the surface into a transferring station at a fourth position,
    (g) engaging a copy medium with said surface at said fourth position to transfer the image,
    (h) rotatably driving said surface about an axis of rotation intersecting said surface during steps (a) and (e), thereby to improve the uniformity of charge and to develop the microimage without tearing or streaking,
    (i) holding and locking said surface stationary during steps (c) and (g) to insure accuracy in the production and transfer of the microimage.

3. The method of electrostatography which includes the steps of
    forming a latent electrostatic microimage on a photoconductive surface,
    driving a carrier fluid in the form of a stream through a closed circuit,
    at one point in the circuit admixing a supply of particulated toner material with the carrier fluid to disperse the toner material throughout the stream,
    at a second point in the circuit inserting said surface at the boundary of said stream,
    and while so inserted rotatably driving the surface on an axis of rotation which intersects the surface,
    thereby to deposit toner material on the surface for developing the image without tearing or streaking.

4. The method of electrostatographic reproduction which includes the steps of
    forming a latent electrostatic microimage in a planar photoconductive surface,
    driving a fluid carrier in the form of a stream,
    admixing with the stream a supply of particulated toner material to disperse the toner material throughout the stream,
    confining and directing the stream of carrier and dispersed toner material closely adjacent the surface and in a direction transversely of and generally parallel to said surface,
    whereby toner particles will be deposited on said surface in the form of the image,
    and concurrently with such development rotatably driving said surface on an axis of rotation which intersects the surface,
    thereby to avoid tears and streaks in the microimage.

5. Electrostatographic apparatus comprising, a disk-shaped support member,
    one face of said support member having a layer of photoconductive material formed thereon providing a flat photoconductive surface,
    means for stationarily positioning said disk-shaped support member in an exposure station,
    means for projecting an image onto said photoconductive surface at said exposure station to form a latent electrostatic image,
    and means forming a development station comprising a development chamber proportioned to channel a carrier fluid in the form of a laminar flow stream extending across said flat photoconductive surface for depositing particulated toner material admixed with said carrier fluid on said surface to develop the image,
    and rotatable driving means for rotating said disk on an axis of rotation intersecting said flat photoconductive surface with said surface positioned at the boundary of said stream so that the stream flows across the entire rotating surface,
    thereby to avoid tearing and streaking of the image.

6. Electrostatographic apparatus as defined in claim 5 wherein said means for projecting an image onto said photoconductive surafce comprises,
  a lens system for projecting a reduced microimage onto a focal plane,
thereby to form a latent electrostatic microimage on said photoconductive surface.

7. Electrostatographic apparatus comprising, a head assembly including a spider having a yoke,
  said head assembly supporting said spider for rotational movement,
    a shaft carried on said yoke for rotation,
    a disk-shaped support member on the end of said shaft having a flat surface disposed transversely of said shaft,
    a layer of photoconductive material on said surface forming an image plane,
      indexing means connected to said head assembly to index said spider through four separate stations corresponding to four quadrants in the rotational movement of said head assembly,
      charging means in a first quadrant of said four quadrants positioned to establish a charging field for said photoconductive layer,
      a lens system having a focal plane in a second quadrant of said four quadrants,
  said yoke positioning said photoconductive image plane in said focal plane,
thereby to receive a microimage and forming a latent electrostatic image,
    a development means at a third quadrant of said four quadrants for depositing particulated toner material on said image plane to develop said microimage,
    transfer means at the fourth quadrant of said four quadrants to engage a copy medium against said image plane to transfer the developed image thereto,
      said head assembly including driving means having a driving connection with said shaft to selectively rotate said shaft,
    and control means regulating the operation of said driving means to rotatably drive said shaft and said image plane when positioned in the first and third quadrants,
thereby to improve the uniformity of the charge and to develop the microimage without tearing or streaking,
    and holding said image plane stationary in the second and fourth quadrants to insure accuracy in the production and transfer of the microimage.

8. Electrostatographic apparatus comprising a disk-shaped support member carrying a layer of photoconductive material disposed in an image plane,
  a shaft connected to said disk and disposed on an axis of rotation intersecting said image plane,
  conduit means forming a fluid circuit,
  compressor means at one point in said circuit for driving a carrier fluid through said circuit in the form of a stream,
  means in said circuit for admixing with said carrier fluid a supply of particulated toner material,
thereby to disperse the toner material throughout the stream,
  means forming a development chamber in said circuit,
    one wall of said chamber having an opening therein to receive said disk-shaped support member and to position said image plane at the boundary of said stream.
  and drive means connected to said shaft to rotate said image plane in said development chamber,
thereby to avoid streaking and tearing of the image.

9. Electrostatographic apparatus comprising, a support member forming a plane surface,
  photoconductive material on said surface forming an image plane,
  means forming a development chamber having one wall apertured to form an opening for receiving said support member with said image plane positioned in the plane of said wall,
  means mounting said support member for selective movement of said image plane into and out of said opening,
  and means to drive a stream of carrier fluid throughout which image material toner particles are dispersed through said development chamber in a direction transversely of and generally parallel to said one wall,
whereby said toner particles will be deposited on said image plane to develop the image and means to rotate said support member in said image plane to reduce tearing and streaking of the image.

10. Electrostatographic apparatus comprising a support member having a plane surface thereon,
  photoconductive material on said surface disposed to form an image plane,
  a carriage carrying in side-by-side relation a corotron ion-producing charging unit and a rotatable cleaning brush,
  track means supporting said carriage for movement parallel to said image plane,
  and a driving means to cycle said carriage back and forth for engagement of said brush with said image plane to clean the photoconductive material, and then positioning said image plane in the charging field produced by said charging unit.

11. Electrostatographic apparatus as defined in claim 10,
  said driving means comprising a motor-driven reversing screw having a driving connection with said carriage.

12. A combined cleaner-charger for electrostatographic apparatus comprising
  a carriage,
  bearing means on said carriage,
  a shaft journaled in said bearing means for rotation,
  a brush on said shaft having bristles radially extending outwardly of said shaft into an action plane,
    said carriage also supporting and carrying a corotron-type ion-producing charging unit positioned transversely adjacent the bristles of said brush,
whereby said corotron will produce a charging field in said action plane,
  a frame support for said carriage comprising a plurality of cross tracks,
    said carriage having bearing means engaging said cross tracks and supporting said carriage for movement parallel to said action plane,
  a spline shaft journaled in said frame support and extending parallel to said cross tracks,
  a slidable driving pulley on said spline shaft and co-rotatable therewith,
  a driven pulley on said brush shaft,
  a pulley belt trained over said driver and driven pulleys,
thereby to rotatably drive said brush while the carriage is traversing its path of movement,
  and drive means for actuating said carriage through a cycle of movement on said cross tracks, whereby a photoconductive member positioned in said action plane will be successively cleaned and charged.

13. Electrostatographic apparatus comprising, a head assembly carrying a spider,
  indexing means operatively connected to said head assembly and indexing said spider circularly through four stations corresponding to four quadrants,
  a support member carried by said spider having a photoconductive surface disposed in an image plane,
    said image plane being successively moved into and through an action plane at said first station in one of said quadrants, a focal plane at said second station in a second of said quadrants, a development plane at said third station in a third of said quadrants, and a transfer plane at said fourth station in the fourth of said quadrants, and means including control means for rotating said support member to rotate said photoconductive surface in said image plane at said first and third stations and for stationarily positioning said image plane at said second and fourth stations.

14. Electrostatographic apparatus as defined in claim 13 and a combined cleaner-charger at said first station comprising a carriage, bearing means on said carriage, a shaft journaled in said bearing means for rotation, a brush on said shaft having bristles radially extending outwardly of said shaft into said action plane, said carriage also supporting and carrying a corotron-type ion-producing charging unit positioned transversely adjacent the bristles of said brush, whereby said corotron will produce a charging field in said action plane, a frame support for said carriage comprising cross tracks, said carriage having bearing means engaging said cross tracks and supporting said carriage for movement parallel to said action plane, a spline shaft journaled in said frame support and extending parallel to said cross tracks, a slidable driving pulley on said spline shaft and co-rotatable therewith, a driven pulley on said brush shaft, a pulley belt trained over said driver and driven pulleys, thereby to rotatably drive said brush while the carriage is traversing its path of movement, and drive means for actuating said carriage through a cycle of movement on said cross tracks, whereby said photoconductive surface will be successively cleaned and charged when positioned in said action plane.

15. Electrostatographic apparatus as defined in claim 4, said carriage further including a light source to illuminate said photoconductive surface in said action plane and remove residual charge patterns therefrom.

16. Electrostatographic apparatus as defined in claim 13, and an optical system at said second station including lenses to project a microimage at said focal plane.

17. Electrostatographic apparatus as defined in claim 16, said optical system including adjustable lenses to insure projection of said microimage at a focal plane corresponding to said photoconductive surface.

18. Electrostatographic apparatus as defined in claim 13, and means forming a development chamber at said third station having one wall apertured to form an opening, means for moving said development chamber relative to said support member whereby said photoconductive surface will be positioned in the plane of said wall, and means to drive a stream of carrier fluid throughout which image material is dispersed through said development chamber in a direction transversely of and generally parallel to said one wall, whereby toner particles will be deposited on said image plane to develop the image.

19. Electrostatographic apparatus as defined in claim 18, and an electrode in said development chamber opposite said opening to improve the deposit of image material on the photoconductive surface.

20. Electrostatographic apparatus as defined in claim 13, and a transfer system at said fourth station comprising a carriage, means on said carriage to support and align a copy medium on said carriage, means forming a vapor chamber having an opening thereinto, means for presenting said copy medium in register with said opening, means to generate a tackifying vapor in said chamber to precondition the exposed portion of said copy medium, and means to engage the conditioned copy medium against the support member to transfer the image thereto.

21. A transfer system for an electrostatographic apparatus comprising, a vapor chamber having a heater therein, said vapor chamber having an opening formed therein, a reservoir for containing a supply of liquid solvent, a metering valve for controlling the supply of liquid from said reservoir to said vapor chamber and against said heater, control means for electrically pulsing said valve and said heater to dispense a sufficient amount of liquid onto the heater to be vaporized by the heater, transport mechanism aligning and supporting a copy sheet, an indexing means for holding said sheet in a first position over said opening in said vapor chamber sufficiently long to condition the surface thereof and to move said sheet to a second position wherein an image is transferred to the conditioned surface.

22. Electrostatographic apparatus as defined in claim 13, and a transfer system at said fourth station comprising a vapor chamber having a heater, said vapor chamber having an opening formed therein, a reservoir for containing a supply of liquid solvent, a metering valve for controlling the supply of liquid from said reservoir to said vapor chamber and against said heater, control means for electrically pulsing said valve and said heater to disense a sufficient amount of liquid onto the heater to be vaporized by the heater, transport mechanism aligning said copy sheet and supporting the copy sheet, an indexing means for holding said sheet in a first position over said opening in said vapor chamber sufficiently long to condition the surface thereof and to move said sheet to a second position wherein an image is transferred to the conditioned surface.

23. A transfer system as defined in claim 21, said heater comprising a woven graphite cloth.

24. Electrostatographic apparatus as defined in claim 22, said heater comprising a woven graphite cloth.

25. Electrostatographic apparatus as defined in claim 13, and a developer mechanism at said third station comprising, first and second wall members fastened together and having confronting surfaces recessed to provide a thin slot extending longitudinally, one of said wall members having an opening formed therein, sealing means surrounding said opening, and means for moving said wall members so that said support member will cap said opening and be engaged by said sealing means, said photoconductive surface forming a continuation of the corresponding of said confronting surfaces as a portion of the side wall area of the slot, whereby toner material directed through the slot will be deposited on the photoconductive surface to develop any latent image contained thereon.

26. Electrostatographic apapratus as defined in claim 25,
the other of said wall members having an electrode opposite said opening to improve the depositing action of the toner material on the photoconductive surface.

27. Electrostatographic apparatus as defined in claim 26, and
an inlet formed at one end of said slot and an outlet formed at the opposite end of said slot,
and means for directing a stream of carrier fluid and toner particles through said slot.

28. Electrostatographic apparatus as defined in claim 27,
said means for directing a stream of carrier fluid and toner particles comprising a plate having plural metering apertures formed therein,
means for filling said metering apertures with toner material,
and means for placing said metering apertures in the stream of carrier fluid to admix the toner particles with the carrier stream.

29. Electrostatographic apparatus comprising a head assembly carrying a spider,
said spider having a yoke providing two diametrically opposite arms,
a shaft journaled in each respective arm and projecting inwardly and outwardly of said arm,
the outermost end of one said shaft having a brush with axially projecting bristles formed thereon,
the outermost end of the other of said shafts having a support member including a photoconductive surface disposed in an image plane,
the innermost end of both of said shafts having a bevel gear driving connection with said head assembly,
thereby to effect rotational driving of said shafts,
indexing means operatively connected to said head assembly and indexing said spider circularly through four stations corresponding to four quadrants,
a support member carried by said spider having a photoconductive surface disposed in an image plane,
said image plane being successively moved into and through
an action plane on said first station in one of said quadrants,
a focal plane on said second station in a second of said quadrants,
a development plane at said third station in a third of said quadrants,
and a transfer plane at said fourth station in the fourth of said quadrants,
and means including control means for rotating said support member to rotate said photoconductive surface in said image plane at said first and third stations and for stationarily positioning said image plane at said second and fourth stations.

30. A developer mechanism for electrostatographic machine comprising
first and second wall members fastened together and having confronting surfaces recessed to provide a thin slot extending longitudinally,
an inlet formed at one of said slot and an outlet formed at the opposite end of said slot,
means for directing a stream of carrier fluid through said slot,
said means for directing a stream of carrier fluid having at one point in the stream a metering means comprising a plate formed with a series of metering apertures,
means for packing said apertures full of toner particles,
and means for moving one aperture at a time into said carrier stream,
thereby to admix the toner particles with the stream,
one of said wall members having an opening formed therein,
and means forming a support member having a photoconductive surface received in said opening and forming a continuation of the corresponding of said confronting surfaces as a portion of the side wall area of the slot,
whereby toner material directed through the slot will be deposited on the photoconductive surface to develop any latent image contained thereon.

31. Electrostatographic apparatus as defined in claim 13
and a developer mechanism at said third station comprising means forming a fluid circuit,
metering means at one point in the circuit comprising a plate having a series of metering apertures,
means for packing said apertures full of toner particles,
means for moving one aperture at a time into the carrier stream,
thereby to admix the contents of said metering aperture into the stream,
and means for directing said carrier stream admixed with carrier particles transversely to said image plane.

32. Electrostatographic apparatus as defined in claim 31,
and an electrode in said developer mechanism opposite said photoconductive surface to improve the deposition of toner particles on the photoconductive surface.

33. Electrostatographic apparatus as defined in claim 13 and
a light pipe at said second station masking said photoconductive surface to burn out residual charges outside of the image area.

34. Electrostatographic apparatus as defined in claim 13 comprising
a ring of translucent light conductive material at said second station having flat parallel surfaces and including a centrally disposed opening corresponding to an image area,
thereby forming a light pipe,
light source means in said ring radially outwardly of said opening,
said ring having an outer opaque portion and an inner clear area,
whereby the clear area will transmit light rays by edge lighting to burn out residual charge patterns on a photoconductive surface outside of the image area.

35. Electrostatographic apparatus as defined in claim 33, and guide means supporting said light pipe for reciprocation toward and away from the photoconductive surface, and a piston motor connected to said light pipe for actuating said light pipe into engagement with said photoconductive surface.

36. A developer mechanism for an electrostatographic machine comprising,
first and second wall members fastened together and having confronting surfaces recessed to provide a thin chamber extending longitudinally to channel a fluid carrying toner material as a laminar stream,
one of said wall members having an opening formed therein,
sealing means surrounding said opening,
and means forming a support member sized to be received in said opening and sealed by said sealing means,
said support member having a photoconductive surface forming a continuation of the corresponding of said confronting surfaces as a portion of the side wall area of the chamber at the boundary of the laminar stream, whereby toner material directed through said chamber in the laminar stream will be deposited on said photoconductive surface to develop any latent image contained thereon and means to rotate the support member in the plane of said photoconductive surface, thereby to minimize tearing and streaking of the image.

37. A developer mechanism as defined in claim 36 and further characterized by
   an inlet formed at one end of said chamber and an outlet formed at the opposite end of said chamber,
   and means for directing a stream of carrier fluid and toner particles through said chamber.

38. Electrostatographic apparatus as defined in claim 40,
   the other of said wall members having an electrode plate intersecting the corresponding surface opposite said opening and forming a portion of the side wall area of said slot,
thereby to improve the deposition of toner material on the photoconductive surface.

39. Electrostatographic apparatus comprising, a support member forming a plane surface,
   photoconductive material on said surface forming an image plane,
   means forming a development chamber having one wall apertured to form an opening receiving said support member with said image plane positioned in the plane of said wall,
   and means to drive a stream of carrier fluid throughout which image material is dispersed through said development chamber in a direction transversely of and generally parallel to said one wall,
whereby toner particles will be deposited on said image plane to develop the image,
   and means to rotate said support member in the plane of said image plane while positioned in said opening,
thereby to avoid tears and streaks in the developed image.

40. A developer mechanism for an electrostatographic machine comprising,
   first and second wall members fastened together and having confronting surfaces recessed to provide a thin slot extending longitudinally,
   one of said wall members having an opening formed therein,
   sealing means surrounding said opening,
   and means forming a support member sized to be received in said opening and sealed by said sealing means,
      said support member having a photoconductive surface forming a continuation of the corresponding of said confronting surfaces as a portion of the side wall area of the slot,
   an inlet formed at one end of said slot and an outlet formed at the opposite end of said slot,
   and means for directing a stream of carrier fluid and toner particles through said slot,
   and means to rotate said support member in the plane of said surface,
thereby to avoid formation of tears and streaks in the image.

41. The method of electrostatographic recording which includes the steps of
   projecting a microimage onto a stationary photoconductive surface to form a latent electrostatic image,
   rotatably turning said photoconductive surface on an axis of rotation intersecting the surface,
   flowing across said rotating photoconductive surface a carrier fluid containing toner material in the form of a stream directed generally normal to said axis of rotation,
   and depositing the toner material on the rotating surface electrostatically to develop the image without tearing or streaking of the image.

References Cited by the Examiner

UNITED STATES PATENTS

| | | | |
|---|---|---|---|
| 1,795,050 | 3/1931 | Simjian | 88—24 |
| 2,524,941 | 10/1950 | Taylor | 95—77 |
| 2,972,931 | 2/1961 | Roob | 95—79 X |
| 3,026,767 | 3/1962 | Smith | 88—24 |
| 3,129,115 | 4/1964 | Clark et al. | 95—1.7 X |
| 3,146,687 | 9/1964 | Donelson et al. | 95—1.7 |
| 3,160,746 | 12/1964 | Clark | 95—1.7 X |

JOHN M. HORAN, *Primary Examiner.*

EVON C. BLUNK, *Examiner.*